(12) United States Patent
Breugelmans et al.

(10) Patent No.: US 12,499,181 B2
(45) Date of Patent: Dec. 16, 2025

(54) DATA PROCESSING APPARATUS AND METHOD

(71) Applicant: Sony Interactive Entertainment Inc., Tokyo (JP)

(72) Inventors: Mark Jacobus Breugelmans, London (GB); Michael Eder, London (GB); Jun Leung, London (GB); Hogarth Andall, London (GB); Danjeli Schembri, London (GB); Bee Lay Tan, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/474,656

(22) Filed: Sep. 26, 2023

(65) Prior Publication Data
US 2024/0111838 A1  Apr. 4, 2024

(30) Foreign Application Priority Data

Sep. 30, 2022 (GB) ...................................... 2214341
Aug. 8, 2023 (GB) ...................................... 2312126

(51) Int. Cl.
*G06F 7/00* (2006.01)
*G06F 16/00* (2019.01)
*G06F 18/24* (2023.01)

(52) U.S. Cl.
CPC .............................. *G06F 18/24765* (2023.01)

(58) Field of Classification Search
None
See application file for complete search history.

(56) References Cited

U.S. PATENT DOCUMENTS

| 9,891,792 | B1 | 2/2018 | Morin et al. |
| 10,938,762 | B2 | 3/2021 | Kwatra |
| 11,093,306 | B1 | 8/2021 | Libin |

(Continued)

OTHER PUBLICATIONS

Combined Search and Examination Report for corresponding GB Application No. 2312126.2, 10 pages, dated Feb. 2, 2024.

(Continued)

*Primary Examiner* — Tuan A Pham
(74) *Attorney, Agent, or Firm* — Kilpatrick Townsend & Stockton LLP

(57) ABSTRACT

A data processing apparatus includes circuitry configured to: receive a first signal indicative of one or more words communicated from a first user of online content to one or more second users of online content; classify the one or more words using the first signal; receive one or more second signals indicative of one or more physiological characteristics of the first user within a time period of a start of the communication of the one or more words; classify the one or more physiological characteristics using the one or more second signals; based on a classification of the one or more words and a classification of the one or more physiological characteristics, generate an action signal indicating that an action associated with the first user of the online content is to be taken, the action signal indicating a characteristic of the action determined based on a combination of the classification of the one or more words and the classification of the one or more physiological characteristics; and output the action signal.

11 Claims, 17 Drawing Sheets

(56) References Cited

U.S. PATENT DOCUMENTS

| | | | |
|---|---|---|---|
| 11,227,009 | B1 | 1/2022 | Anubhai |
| 11,429,906 | B2* | 8/2022 | Suri ................. G06Q 10/06315 |
| 2009/0174702 | A1 | 7/2009 | Garbow |
| 2015/0099586 | A1 | 4/2015 | Huang |
| 2016/0117937 | A1 | 4/2016 | Penders |
| 2020/0036810 | A1 | 1/2020 | Howard |
| 2020/0134298 | A1 | 4/2020 | Zavesky |
| 2020/0372544 | A1 | 11/2020 | Moskowitz |
| 2021/0035541 | A1 | 2/2021 | Pande et al. |
| 2021/0233537 | A1* | 7/2021 | Yang ....................... G10L 15/22 |
| 2021/0272584 | A1 | 9/2021 | MCalpine |
| 2021/0322888 | A1 | 10/2021 | Arroyo Palacios |
| 2021/0400142 | A1* | 12/2021 | Jorasch ............... H04L 65/1069 |
| 2022/0005612 | A1 | 1/2022 | Quan |
| 2022/0067070 | A1 | 3/2022 | Christensen et al. |
| 2022/0111297 | A1 | 4/2022 | Rudi |
| 2022/0215857 | A1* | 7/2022 | Bang ....................... G10L 15/08 |
| 2022/0392437 | A1 | 12/2022 | Moschella |
| 2023/0230599 | A1* | 7/2023 | Sharma ................... G10L 17/04 |
| | | | 704/260 |

OTHER PUBLICATIONS

Combined Search and Examination Report for corresponding GB Application No. 2214341.6, 7 pages, dated Feb. 1, 2023.
Final Office Action in related U.S. Appl. No. 18/474,680, 22 pages, dated Feb. 21, 2025.
Examination Report for related GB Application No. 2214341.6, 6 pages, dated Jan. 29, 2025.

* cited by examiner

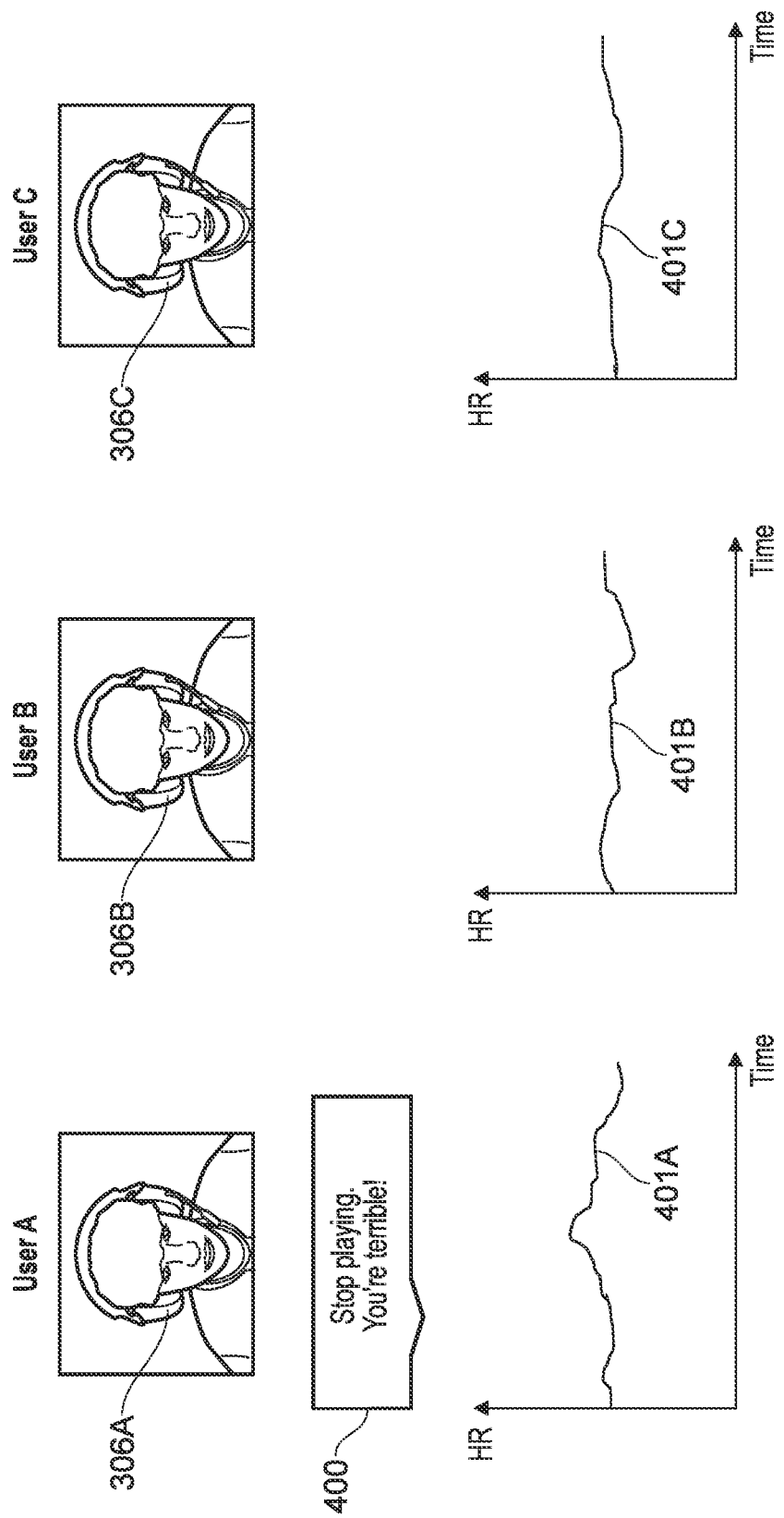

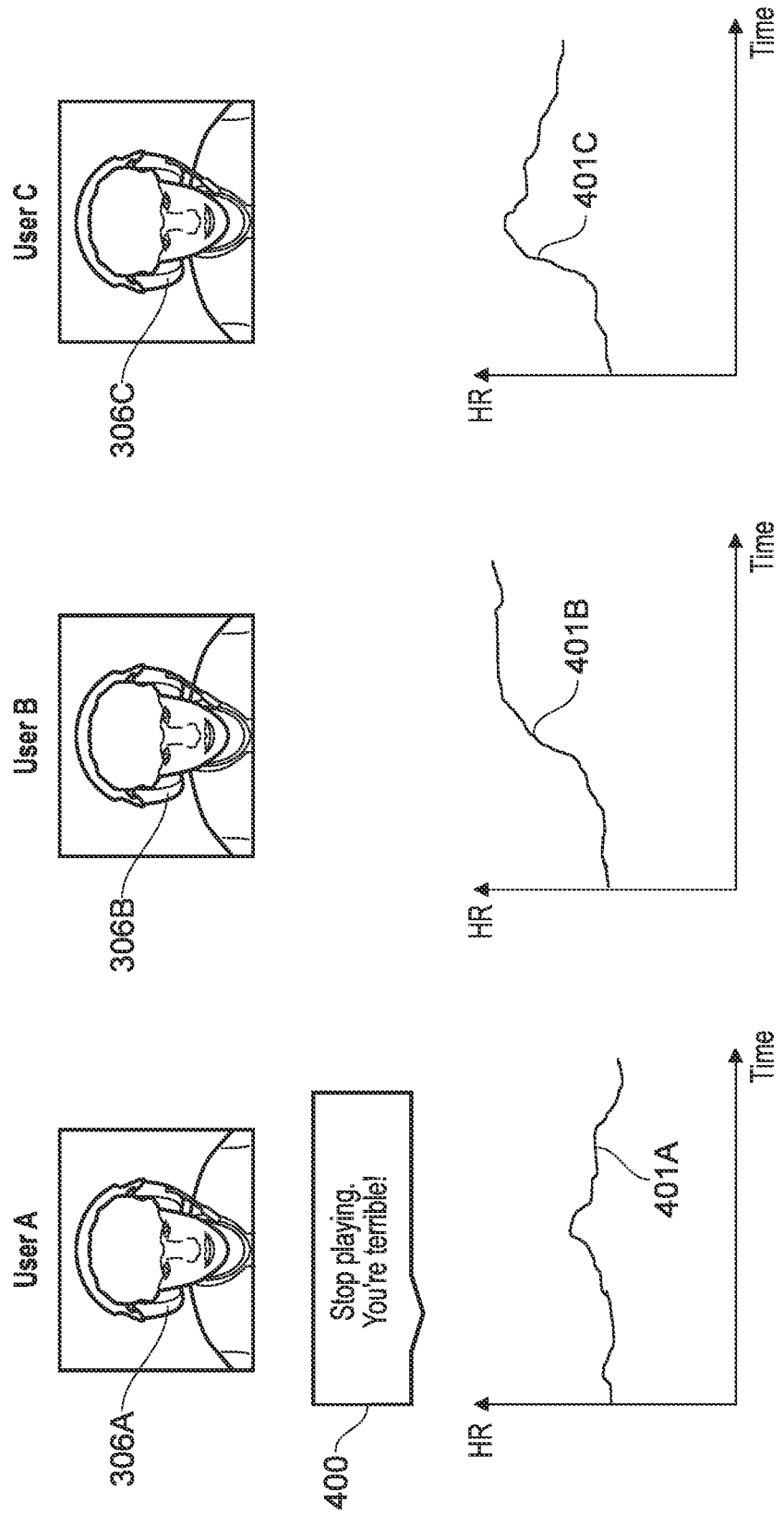

| Phrase classification | Heart Rate | Facial expression classification | Action |
| --- | --- | --- | --- |
| Slightly offensive | < 120 bpm | Relaxed | None |
| Slightly offensive | ≥ 120 bpm | Relaxed | Tier 1 warning |
| Slightly offensive | ≥ 120 bpm | Angry | Tier 2 warning |
| Highly offensive | < 120 bpm | Relaxed | Tier 1 warning |
| Highly offensive | ≥ 120 bpm | Relaxed | Tier 2 warning |
| Highly offensive | ≥ 120 bpm | Angry | Suspension |

Fig. 10

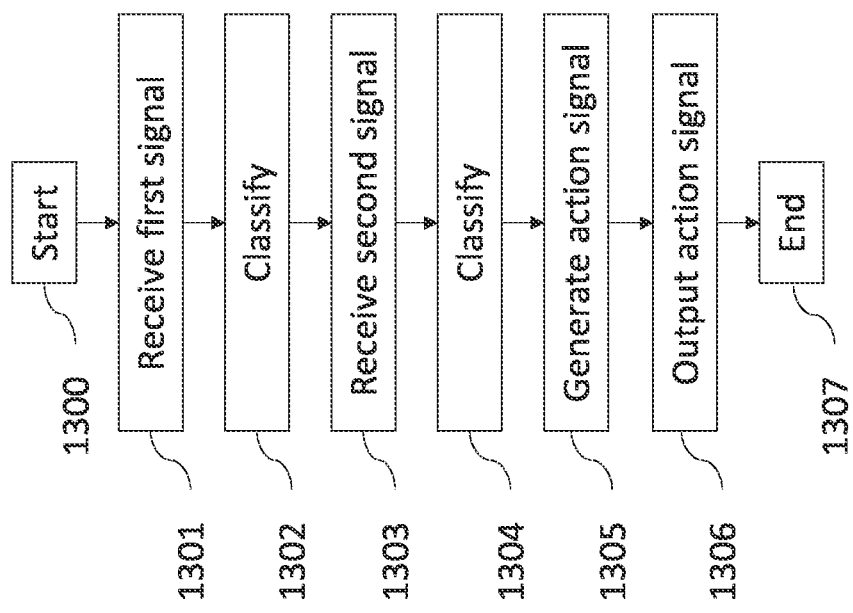

DATA PROCESSING APPARATUS AND METHOD

BACKGROUND

Field of the Disclosure

This disclosure relates to a data processing apparatus and method.

Description of the Related Art

There is a growing number of types of content which enable a large number of users to interact with each other in a virtual online environment. For example, massively multiplayer online games (MMOGs) allow hundreds or even thousands of users to simultaneously play an online video game and to interact with each other. The users may or may not have met each other in person. This can help provide innovative and engaging gaming experiences for users.

One way in which users may interact with each other during the game is through verbal or textual communication. Textual communication may be achieved through typing on a keyboard, for example. Verbal communication may be achieved through each user speaking into a microphone (e.g. a microphone of a headset worn by each respective user), for example.

Such communication functionality can be useful for achieving certain game objectives and improving user engagement with the game. For example, if multiple users must work together in the game to achieve a certain game objective, it can be very useful for them to be able to communicate with each other in order to delegate tasks, warn of in-game dangers and the like. In another example, if multiple users are competing against each other in the game, allowing the users to communicate with each other can make the game more interesting.

A negative consequence, however, is that a minority of users may use the communication functionality to verbally abuse or bully other users in the game. Methods do exist to try to combat this. For example, a user who has been abused can report the abuse to a game moderator and the user who undertakes the abuse can be reprimanded accordingly (e.g. with a warning or even being denied future access to the game).

Such existing reporting systems can be, however, relatively basic and come with their own problems. For example, a user who has been reprimanded is often given little or no information about why they have been reprimanded. This can make it more difficult for them to change their behaviour in the future in order to avoid further reprimands. Furthermore, even the reporting system can be open to abuse. For instance, a player who has abused another player may falsely report the player who has been abused as the abuser. This leads to the player who suffered the abuse being unfairly reprimanded and allows the player who undertook the abuse to continue to abuse other players without consequence.

There is therefore a desire for a technical solution to detecting and addressing abuse of users of interactive online content.

SUMMARY

The present disclosure is defined by the claims.

BRIEF DESCRIPTION OF THE DRAWINGS

Non-limiting embodiments and advantages of the present disclosure are explained with reference to the following detailed description taken in conjunction with the accompanying drawings, wherein:

FIGS. 4A and 4B illustrate example situations occurring during implementation of multiple user online content;

FIG. 10 shows an example lookup table;

FIG. 13 shows a further example method.

Like reference numerals designate identical or corresponding parts throughout the drawings.

DETAILED DESCRIPTION OF THE EMBODIMENTS

Figure 1:
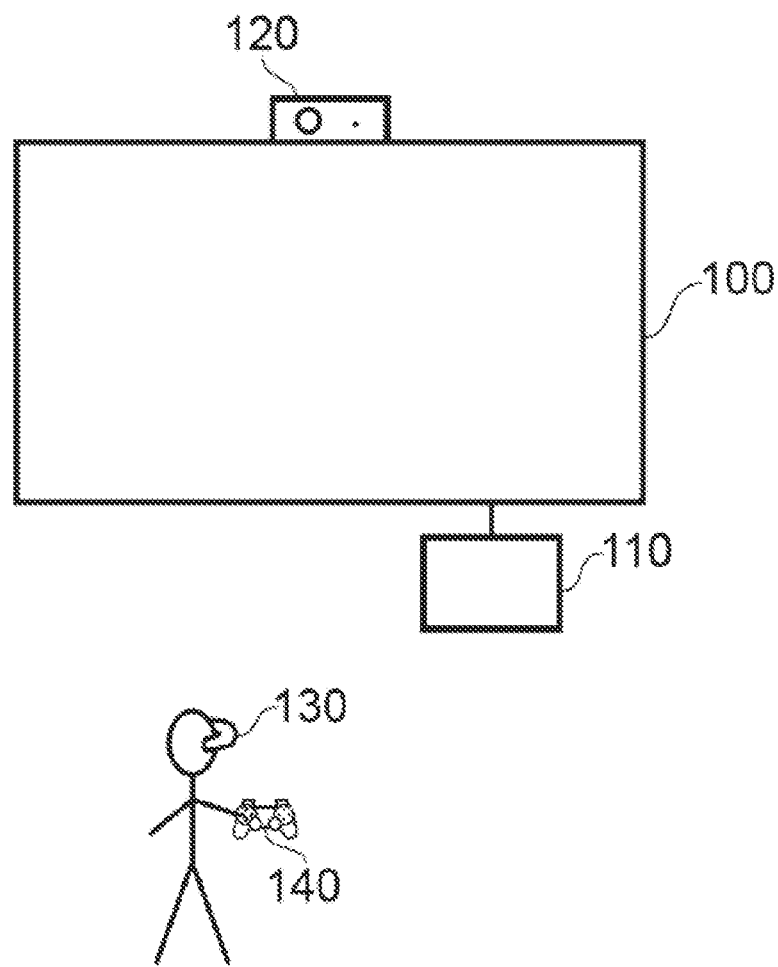
FIG. 1 schematically shows an example entertainment system.

FIG. 1 schematically illustrates an entertainment system suitable for implementing one or more of the embodiments of the present disclosure. Any suitable combination of devices and peripherals may be used to implement embodiments of the present disclosure, rather than being limited only to the configuration shown.

A display device 100 (e.g. a television or monitor), associated with a games console 110, is used to display content to one or more users. A user is someone who interacts with the displayed content, such as a player of a game, or, at least, someone who views the displayed content. A user who views the displayed content without interacting with it may be referred to as a viewer. This content may be a video game, for example, or any other content such as a movie or any other video content. The games console 110 is an example of a content providing device or entertainment device; alternative, or additional, devices may include computers, mobile phones, set-top boxes, and physical media playback devices, for example. In some embodiments the content may be obtained by the display device itself—for instance, via a network connection or a local hard drive.

One or more video and/or audio capture devices (such as the integrated camera and microphone 120) may be provided to capture images and/or audio in the environment of the display device. While shown as a separate unit in FIG. 1, it is considered that such devices may be integrated within one or more other units (such as the display device 100 or the games console 110 in FIG. 1).

In some implementations, an additional or alternative display device such as a head-mountable display (HMD)

130 may be provided. Such a display can be worn on the head of a user, and is operable to provide augmented reality or virtual reality content to a user via a near-eye display screen. A user may be further provided with a video game controller 140 which enables the user to interact with the games console 110. This may be through the provision of buttons, motion sensors, cameras, microphones, and/or any other suitable method of detecting an input from or action by a user.

Figure 2A:
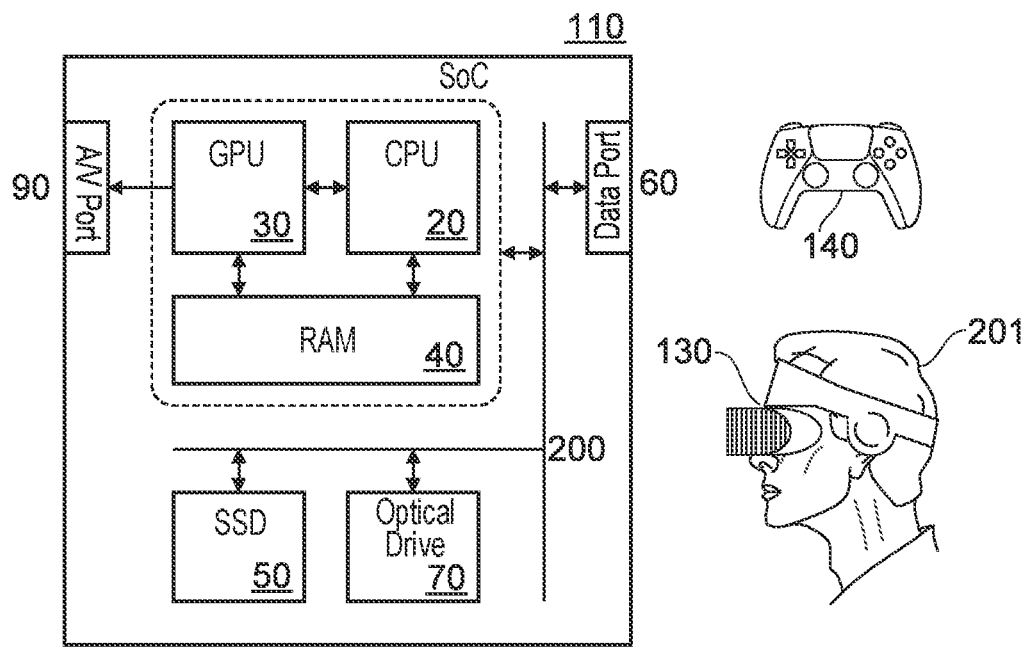
FIGS. 2A and 2B schematically show example components associated with the entertainment system.

FIG. 2A shows an example of the games console 110. An example is the Sony® PlayStation 5® (PS5). The games console 110 is an example of a data processing apparatus.

The games console 110 comprises a central processing unit or CPU 20. This may be a single or multi core processor, for example comprising eight cores as in the PS5. The games console also comprises a graphical processing unit or GPU 30. The GPU can be physically separate to the CPU, or integrated with the CPU as a system on a chip (SoC) as in the PS5.

The games console also comprises random access memory, RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive (SSD), or an internal SSD as in the PS5.

The games console may transmit or receive data via one or more data ports 60, such as a universal serial bus (USB) port, Ethernet® port, WiFi® port, Bluetooth® port or similar, as appropriate. It may also optionally receive data via an optical drive 70.

Interaction with the games console is typically provided using one or more instances of the controller 140, such as the DualSense® handheld controller in the case of the PS5. In an example, communication between each controller 140 and the games console 110 occurs via the data port(s) 60.

Audio/visual (A/V) outputs from the games console are typically provided through one or more A/V ports 90, or through one or more of the wired or wireless data ports 60. The A/V port(s) 90 may also receive audio/visual signals output by the integrated camera and microphone 120, for example. The microphone is optional and/or may be separate to the camera. Thus, the integrated camera and microphone 120 may instead be a camera only. The camera may capture still and/or video images.

Where components are not integrated, they may be connected as appropriate either by a dedicated data link or via a bus 200.

As explained, examples of a device for displaying images output by the game console 110 are the display device 100 and the HMD 130. The HMD is worn by a user 201. In an example, communication between the display device 100 and the games console 110 occurs via the A/V port(s) 90 and communication between the HMD 130 and the games console 110 occurs via the data port(s) 60.

The controller 140 is an example of a peripheral device for allowing the games console 110 to receive input from and/or provide output to the user. Examples of other peripheral devices include wearable devices (such as smartwatches, fitness trackers and the like), microphones (for receiving speech input from the user) and headphones (for outputting audible sounds to the user).

Figure 2B:
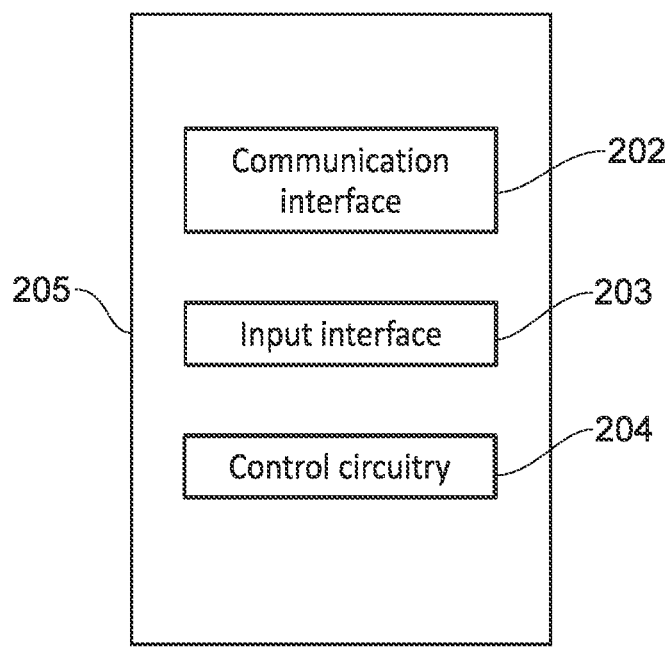

FIG. 2B shows some example components of a peripheral device 205 for receiving input from a user. The peripheral device comprises a communication interface 202 for transmitting wireless signals to and/or receiving wireless signals from the games console 110 (e.g. via data port(s) 60) and an input interface 203 for receiving input from the user. The communication interface 202 and input interface 203 are controlled by control circuitry 204.

In an example, if the peripheral device 205 is a microphone, the input interface 203 comprises a transducer for detecting speech uttered by a user as an input. In another example, if the peripheral device 205 is a fitness tracker, the input interface 203 comprises a photoplethysmogram (PPG) sensor for detecting a heart rate of the user as an input. The input interface 203 may take any other suitable form depending on the type of input the peripheral device is configured to detect.

Figure 3:
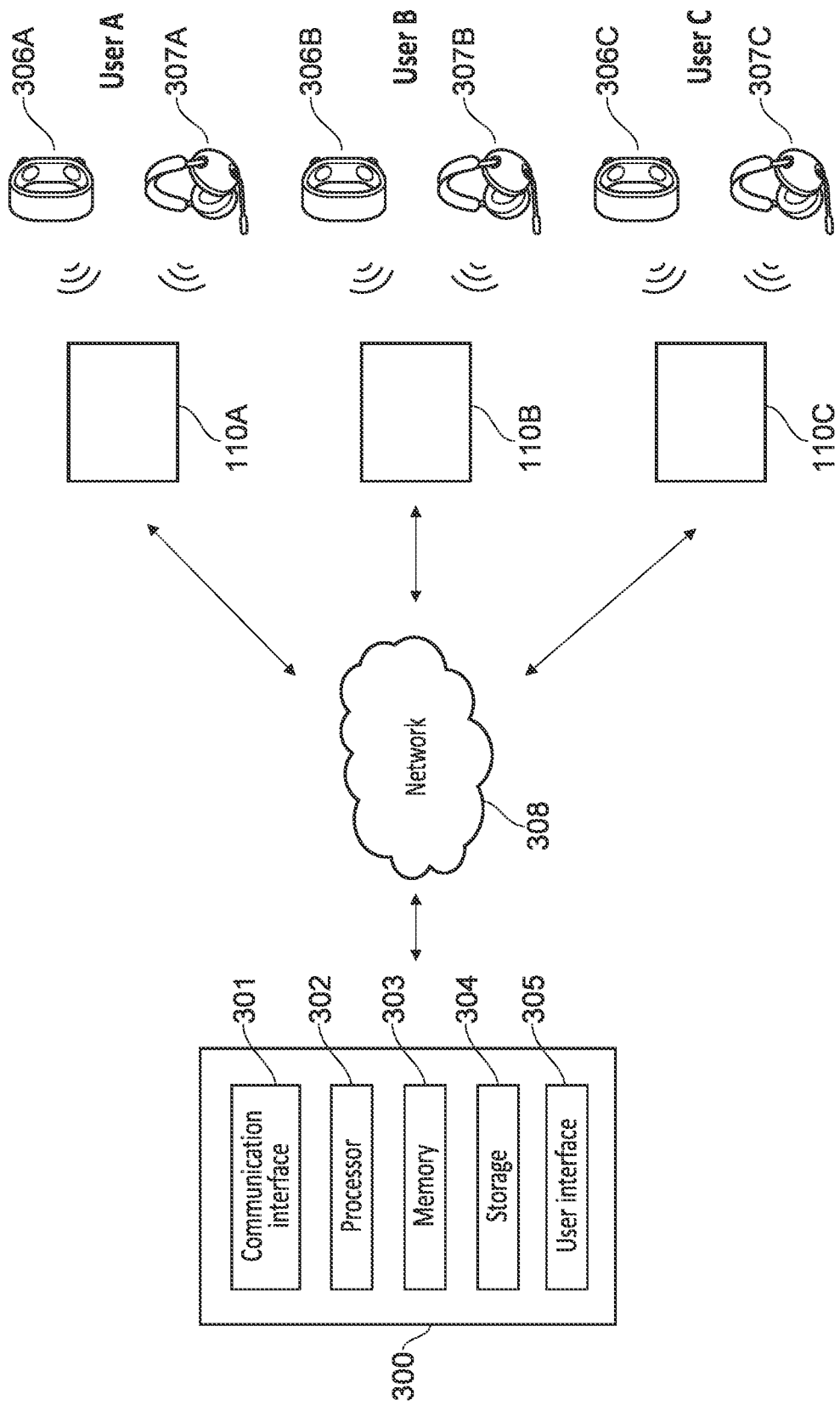
FIG. 3 schematically shows an example system for implementing multiple user online content.

FIG. 3 shows an example way of implementing multiple user online content. In this example, the content is a MMOG.

The MMOG is implemented using a server 300, which is another example of a data processing apparatus. The server comprises a communication interface 301 for sending electronic information to and/or receiving electronic information from one or more other apparatuses, a processor 302 for executing electronic instructions, a memory 303 for storing the electronic instructions to be executed and electronic input and output information associated with the electronic instructions, a storage medium 304 (e.g. a hard disk drive or solid state drive) for long term storage of information and a user interface 305 (e.g. a touch screen, a non-touch screen, buttons, a keyboard and/or a mouse) for receiving commands from and/or outputting information to a user. Each of the communication interface 301, processor 302, memory 303, storage medium 304 and user interface 305 are implemented using appropriate circuitry, for example. The processor 302 controls the operation of each of the communication interface 301, memory 303, storage medium 304 and user interface 305.

The service 300 is connected over a network 308 (e.g. the internet) to a plurality of further data processing apparatuses associated with different respective users. In this example, each further data processing apparatus is a games console having the features of games console 110. Each games console, in turn is connected to a plurality peripheral devices. In this example, each peripheral device has the features of peripheral device 205. In particular, a first games console 110A belonging to a first user (User A) has, as peripheral devices, a first fitness tracker 306A and a first headset 307A. A second games console 110B belonging to a second user (User B) has, as peripheral devices, a second fitness tracker 306B and a second headset 307B. A third games console 110C belonging to a third user (User C) has, as peripheral devices, a third fitness tracker 306C and a third headset 307C. The server 300 connects to the network 300 via the communication interface 301 and each games console connects to the network 300 via its respective data port(s) 60, for example.

In order for Users A, B and C to partake in the MMOG together, separate copies of the same MMOG video game application are executed (e.g. by CPU 20 and/or GPU 30) on each games console 110A, 110B and 110C. The video game application causes the games console on which it is run to exchange data with the server 300 over the network 308. This allows video game data generated by games console 110A (e.g. the real time position of a video game character controlled by User A) to be shared with games consoles 110B and 110C. Similarly, it allows video game data generated by games console 110B to be shared with games consoles 110A and 110C and video game data generated by games console 110C to be shared with games consoles 110A and 110B. This allows Users A, B and C to interact with each other in the MMOG even though they may be in different physical locations. Only three users are shown here for simplicity. In reality, a much larger number of users may be connected (e.g. through respective games consoles associated with each other) to the server 300 via the network 308 in order to play and interact with each in the MMOG. The server 300 may perform various functions such as correctly routing video game data between the games consoles.

As well as video game data being exchanged between the games consoles 110A, 110B and 110C via the server 300, users may also communicate with each other (as previously described) via the games consoles and server. In this example, Users A, B and C each have a headset 307A, 307B and 307C connected (e.g. via a Bluetooth® or Wi-Fi® connection) to their respective games consoles 110A, 110B and 110C. Each headset comprises a microphone (an example of a peripheral device 205 with a transducer as the input interface 203) to allow a user to speak to another user and headphones to allow a user to hear speech from other users. Electronic signals indicative of the speech of a user detected by the microphone of that user's headset is transmitted to the headphones of the headset of another user via the network 308 and server 308.

As discussed, although allowing communication between users in this way can enrich a user's experience of shared content, it has the undesirable effect of also allowing a minority of users to verbally abuse or bully other users. As also discussed, existing reporting mechanisms rely only on simple user reports of abuse and provide no or little information about the specifics of the abuse to an alleged abuser. Furthermore, even if information about the abuse is recorded (e.g. based on speech recognition of certain words), it can still be difficult to distinguish abuse or bullying from non-abusive conversation. For instance, whether or not a certain verbal phrase is offensive can depend on context and how it makes the listeners feel. This makes it difficult to detect abuse purely based on, for example, detection of certain swear words or the like.

The present technique helps address this problem by taking into account user physiological information in detecting potential abuse. This is exemplified in FIGS. 4A and 4B.

FIGS. 4A and 4B show an example situation in which User A speaks the phrase 400 ("Stop playing. You're terrible!") into the microphone of their headset 307A while playing an online game with Users B and C. Users B and C are able to hear the spoken phrase via the headphones of their respective headsets 307B and 307C. The phrase 400 may be taken as offensive by some users but not offensive by other users. For example, if Users A, B and C are friends who regularly play online games together and partake in light-hearted insults to each other during games, it is less likely the phrase 400 will cause offense. It is therefore less likely to be appropriate for User A to be reprimanded in this situation. In another example, however, if Users A, B and C are strangers playing an online game together and User A utters phrase 400 to genuinely hurt the feelings of Users B and/or C, then it is more likely the phrase 400 will cause offense. It is therefore more likely to be appropriate for User A to be reprimanded in this situation.

In order to determine the extent to which the phrase 400 uttered by User A causes offense to Users B and/or C, physiological information about each of the users may be considered. For example, any physiological information which may be indicative of a level of stress of a user may be used. For instance, a user's heart rate may be measured (with a higher heart rate potentially being indicative of higher stress and a lower heart rate potentially being indicative of lower stress). As another example, a user's perspiration (sweat) level may be measured (with a higher level of perspiration potentially being indicative of higher stress and a lower level of perspiration potentially being indicative of lower stress). In this case, a peripheral device 205 operable to measure a level of perspiration from the user may be used. The input interface 203 of such a peripheral device may comprise perspiration detection hardware such as a suitable fluorescence sensor, colorimetric sensor or electrochemical sensor, for example. The input interface 203 of a peripheral device 205 such as a fitness tracker may comprise a plurality of components to allow it to detect both the heart rate (e.g. measured in beats per minute, bpm) and a level of perspiration (e.g. measured in grams per minute per metre squared, $g/min\ m^2$) of a user wearing the fitness tracker. As another example, a user's facial expression may be indicative of a user's stress level. In this case, a user's facial expression may be captured by integrated camera and microphone 120, for example.

FIGS. 4A and 4B show an example in which the physiological information is a user's heart rate. This is captured by a PPG sensor of each respective fitness tracker 306A, 306B and 306C worn by User A, B and C as they play the online game. The heart rate data captured by each PPG sensor is transmitted by the fitness tracker in which it is comprised to the sever 300 via the respective games console 110A, 110B or 110C and the network 308, for example. Each fitness tracker 306A, 306B and 306C is connected to its respective games console 110A, 110B and 110C via a Bluetooth® or Wi-Fi® connection, for example.

FIG. 4A shows a first example situation in which no offense to Users B or C is caused by User A uttering the phrase 400. A graph of heart rate against time (the time axis beginning from the time when the phrase 400 was uttered and extending over a predetermined time period, such as 10, 15, 20 or 30 seconds) is shown for each user. Specifically, graph 401A shows the heart rate of User A, graph 401B shows the heart rate of User B and graph 401C shows the heart rate of User C. It is seen that none of the users, in particular neither User B nor User C (who will have heard the phrase 400 uttered by User A) experience any significant increase in heart rate after User A utters the phrase 400. Neither User B nor User C are thus determined as likely to have experienced offense due to the phrase 400. User A is therefore not reprimanded and they are able to continue playing the online game as normal.

FIG. 4B, on the other hand, shows a second example situation in which offense to Users B and C is caused by User A uttering the phrase 400. This is indicated by the graphs 401A, 401B and 401C of heart rate against time shown for each user. It is seen that, contrary to the situation of FIG. 4A, after User A utters the phrase 400, while User A does not experience any significant increase in heart rate, the heart rate of both Users B and User C significantly increases. This is indicative of User B and User C being likely to have experienced offense due to the phrase 400. It may therefore be appropriate for User A to be reprimanded in order to try to prevent them making further utterances of the phrase 400.

In an example, the server 300 monitors the heart rate of each user in the online game who is able to hear the utterance of a particular phrase by one user for a predetermined time (e.g. 10, 15, 20 or 30 seconds) after the phrase is uttered (the predetermined time starting at the point the user is no longer detected as talking, for example). If the heart rate of more than a predetermined number or portion of the users who were able to hear the phrase increases by more than a predetermined threshold (e.g. more than 15, 25, 30 or 50 beats per minute) within that predetermined time, it is determined that the uttered phrase has potentially caused offense to those user(s). The user who uttered the phrase can then be reprimanded.

In another example, the server 300 monitors the perspiration level of each user in the online game who is able to hear the utterance of a particular phrase by one user for a predetermined time (e.g. 10, 15, 20 or 30 seconds) after the phrase is uttered (the predetermined time starting at the point the user is no longer detected as talking, for example). If the perspiration level of more than a predetermined number or portion of the users who were able to hear the phrase increases by more than a predetermined threshold (e.g. more than 0.1, 0.2, 0.5 or 1.0 g/min m$^2$) within that predetermined time, it is determined that the uttered phrase has potentially caused offense to those user(s). The user who uttered the phrase can then be reprimanded.

Figure 5:
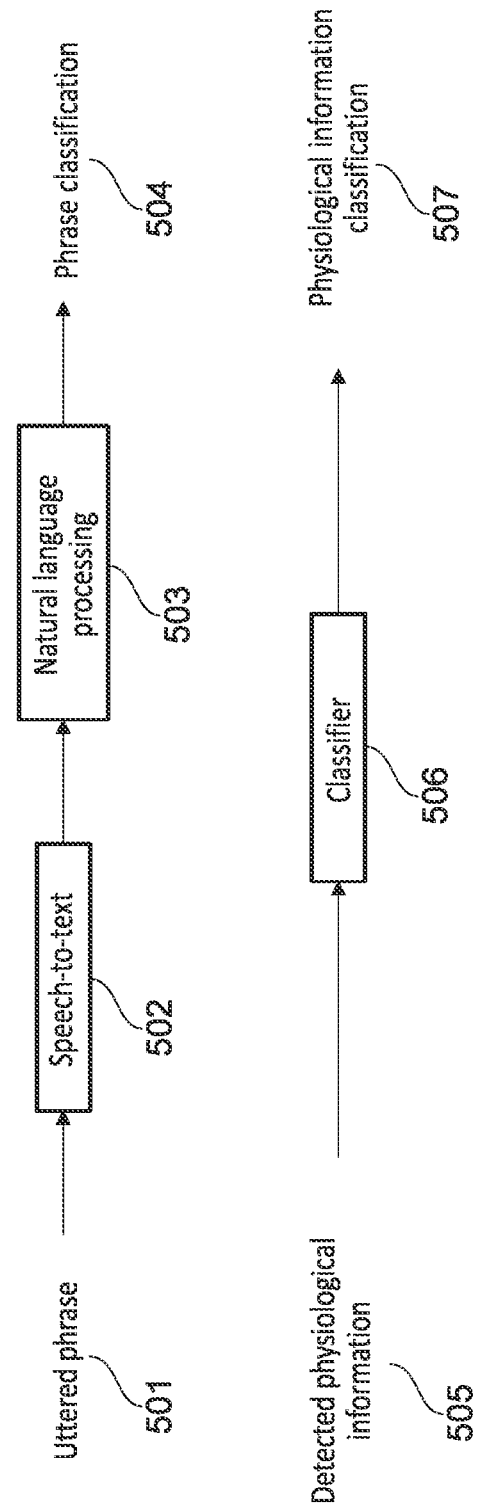
FIG. 5 schematically shows an example of how an uttered phrase and corresponding physiological information of users can be analysed.

FIG. 5 shows a more general example of how an uttered phrase and corresponding physiological information of users who hear the phrase during an online game can be analysed to determine the likelihood of offense being caused by the uttered phrase. In an example, these are steps carried out by the processor 302 of the server 300 based on signal(s) received by the communication interface 301 of the server indicative of the uttered phrase (e.g. a digital audio recording of the uttered phrase captured by the microphone of the headset 307A of User A, recorded by the games console 110A and transmitted over the network 308) and based on signal(s) received by the communication interface of the server indicative of physiological information of one or more users who heard the uttered phrase (e.g. the heart rate data of Users B and C captured by the PPGs of the fitness trackers 306B and 306C, recorded by the respective games consoles 110B and 110C and transmitted over the network 308).

In FIG. 5, an uttered phrase 501 (e.g. in the form of a digital audio recording) is first passed to a speech-to-text program 502 (such as a Hidden Markov Model (HMM) algorithm). This converts the uttered phrase into a textual format. The uttered phrase in the textual format is then passed to a natural language processing program 503. The present technique is also applicable to typed phrases (e.g. obtained by a user typing the phrase onto a keyboard connected to their games console). In this case, the uttered phrase 501 is already in a textual format and therefore application of the speech-to-text program 502 may be skipped.

The natural language processing program 503 classifies the uttered phrase according to its offensiveness. In a simple example, a phrase may be classified as either "offensive" or "inoffensive". A higher number of classifications (e.g. to indicate the extent to which a phrase is considered offensive, such as "slightly offensive", "highly offensive" and the like) may also be used. In an example, the natural language processing program is a machine learning model (such as a bag-of-words model) which has previously been trained using a training set of phrases and their respective labelled classifications. A training set may be generated by capturing, for instance, a number (e.g. 5,000) of phrases uttered by various users during an online gaming session and manually labelling these as either "offensive" or "inoffensive" (or any other classification, if these are used).

A phrase classification 504 is output by the natural language processing program 503. For example, the natural language processing program 503 may be trained to classify phrases as either "offensive" or "inoffensive". In the example of FIGS. 4A and 4B, the phrase 400 is classified as "offensive".

Also in FIG. 5, detected physiological information 505 (e.g. heart rate data) is passed to a physiological information classifier 506. For example, the classifier 505 is a program which determines whether or not the detected physiological information is indicative of user stress and outputs a physiological information classification 507 based on this.

In the example of FIGS. 4A and 4B, the classifier determines, for instance, whether or not the heart rate of Users B and C increases by more than a threshold amount within a predetermined period of time following the utterance of the phrase 400. The resulting physiological information classification 507 will then be "stressed" if the threshold is exceeded or "non-stressed" if the threshold is not exceeded.

The classifier 506 takes a form appropriate to the physiological information provided to the server 300. In the example of FIGS. 4A and 4B, the classifier 305 takes into account only one type of physiological information (that is, an overall change in heart rate over a predetermined time period starting from the utterance of the phrase 400). More generally, however, the classifier 305 may take into account one or more types of physiological information simultaneously and use this to generate a physiological information classification indicating whether or not (and, optionally, the extent to which) a user is offended by phrases used by another user. As with the phrase classification, there may be more than two physiological information classifications (so not just "stressed" or "non-stressed" but, for instance, "mildly stressed", "severely stressed" or the like).

In an example, the classifier is a suitably trained machine learning model (e.g. an artificial neural network (ANN)) which is able to take one or more types of physiological information and generate a physiological information classification based on that physiological information. For instance, the classifier may receive heart rate data and perspiration data of a first user recorded over a predetermined time period starting from the utterance of a phrase by a second user and data indicating a classification of a facial expression of the first user in an image captured at a certain time within that predetermined time period (e.g. if the predetermined time period is 10 seconds after the utterance of the phrase, the captured image on which the facial expression classification is applied is captured after 5 seconds of the 10 second period). The classifier may have been previously trained using a training set of a number (e.g. 5,000) of instances of captured heart rate data, perspiration data and facial expression classification data and corresponding manually labelled classifications (e.g. "severely stressed", "mildly stressed", "non-stressed" and the like), for example.

In an example, the classification of a facial expression is based on a convolutional neural network (CNN) which has been previously trained using a training set of a number (e.g. 5,000) of captured images of faces and corresponding manually labelled classifications indicating a mood of those faces (e.g. "happy", "sad", "angry", "anxious" and the like). The CNN may be run by the processor 302 of the server 300 and may, for example, receive and classify a captured image of a user received by the server 300 together with heart rate and perspiration data for that user. Once generated by the CNN, the facial expression classification is then provided to the classifier 506 with the heart rate and perspiration data as detected physiological information 505.

The steps of FIG. 5 may be carried out by more or more apparatuses. In one example, each step is carried out by the processor 302 of the server 300. In another example, however, a portion of the steps may be carried out by one or more of the games consoles 110A, 110B and 110C connected to the server 300 over the network 308. For example, to reduce the use of network resources and improve user privacy, the speech-to-text step 502 may be carried out at the games console side. The uttered phrase 501 in textual form is then transmitted to the server 300 over the network 308.

In an example, during an online game involving a plurality of users, data indicative of phrases uttered by each user during the game (e.g. textual data or a digital audio recording) is timestamped with the time at which the data was recorded by that user's games console 110 and transmitted to the server 300 with the timestamp and a unique identifier of the user (e.g. a unique username of the user previously registered at the server 300). Similarly, physiological information detected for each user during the game (e.g. heart rate data, perspiration data and/or a captured image of a facial expression of the user) is timestamped with the time at which the data was recorded by that user's games console 110 and transmitted to the server 300 with the timestamp and the unique identifier of the user.

Each uttered phrase is then classified by the sever to determine a level of offensiveness of the phrase. The physiological information with a timestamp within a predetermined time period starting from the time of the timestamp of a given uttered phrase is also classified by the server to determine a level of stress associated with the physiological information. The classification(s) of the physiological information are then associated with the classification of the uttered phrase. This is then used to determine whether it is appropriate for the user who uttered the phrase to be reprimanded for causing offence to other users.

Thus, for example, if the timestamp of an uttered phrase by User A is 10:04:48 (10 hours, 4 minutes, 48 seconds) and the predetermined time period is 10 seconds, then the classification of all physiological information recorded for Users B and C with a time stamp between 10:04:49 and 10:04:58 will be associated with the classification of the uttered phrase. If the classification of the uttered phrase is "inoffensive", then User A will not be reprimanded. If the classification of the uttered phrase is "offensive" but none of the associated physiological information recorded for Users B and C is classified as "stressed", then User A will also not be reprimanded. However, if the classification of the uttered phrase is "offensive" and at least one instance of associated physiological information (an instance of physiological information being, for example, a set of one or more types of physiological information, such as heart rate data, perspiration data or an image of a user's facial expression, with the same timestamp) for at least one user is classified as "stressed", then User A may be reprimanded.

This is a simplified example based on only two possible classifications for an uttered phrase ("offensive" or "inoffensive") and two possible classifications for an instance of physiological information ("stressed" or "non-stressed"). Further classifications for both an uttered phrase and/or an instance of physiological information may be used (e.g. "highly offensive", "mildly stressed", etc. as previously discussed) and the relationship between such classifications for determining whether or not a particular user is to be reprimanded may be more complicated. For example, there may be different levels of reprimand. For instance, a lower reprimand level may involve a user being provided with a warning whereas a higher reprimand level may involve a user being denied future participation in the online game. In an example, a lower reprimand level may be a consequence of a phrase which causes a smaller amount of offence (e.g. a phrase with a "slightly offensive" classification which is associated with a "mildly stressed" physiological information classification but not a "severely stressed" physiological classification). On the other hand, a higher reprimand level may be a consequence of a phrase which causes a larger amount of offence (e.g. a phrase with a "highly offensive" classification which is associated with at least one "severely stressed" physiological information classification).

Alternatively, or in addition, the reprimand of a user may also be dependent on the number of users which are caused apparent stress by a phrase uttered by the user. For example, if less than a predetermined number or proportion of users (e.g. 25% of users) hearing a phrase classified as "offensive" during the online game experience a "stressed" state based on their recorded physiological information, the user who uttered the phrase may be subject to a lower reprimand level. On the other hand, if more than the predetermined number or proportion of users hearing the phrase experience a "stressed" state based on their recorded physiological information, the user who uttered the phrase may be subject to a higher reprimand level. The reprimand level associated with classification of the uttered phrase, the classification of associated physiological information and/or the number of users whose recorded physiological information is indicative of stress may be indicated in a lookup table or the like stored in the storage medium 304 of the server, for example.

In an example, determination of a reprimand level for a user based on the classification of a phrase uttered by that user and the associated classification(s) of detected physiological information of other user(s) may result in an automatically implemented reprimand for the user. In this case, the server 300 implements the appropriate reprimand (e.g. indicated by a lookup table, as mentioned above) without further input from a human moderator. For instance, the server 300 may cause the user who uttered the phrase to be denied (at least temporarily) from accessing the online game (e.g. by suspending an online gaming account associated with a user name of the user) or transmit a signal (action signal) to the games console of the user to cause the games console to output a warning message to the user.

In another example, the reprimand is not automatically implemented but, rather, is recommended to a human moderator with access to the server 300. For example, the processor 302 outputs a signal (action signal) causing the uttered phrase, associated physiological information and recommended reprimand may be presented to the moderator (e.g. by a display (not shown) comprised as part of the user interface 305 of the server 300). If the moderator agrees with the recommended reprimand, they may confirm this by providing a predetermined input (e.g. selecting a displayed "Confirm" virtual button using an input device (e.g. keyboard, mouse or touchscreen) comprised as part of the user interface 305). On the other hand, if the moderator does not agree with the recommended reprimand (e.g. based on a specific context of the uttered phrase which was not picked up by the classifier), they may be presented with the option to, for example, proceed with no reprimand or select a different reprimand based on their judgement.

In either case, due to the recording of the uttered phrase and the recording of physiological information associated with users who hear the uttered phrase, a technically more comprehensive and consistent approach to dealing with abuse of users in an online environment is provided. For example, users are able to understand why they are being reprimanded for certain behaviour (e.g. utterance of certain offensive phrases and the effect this has on other users).

Furthermore, it is more difficult for users who are not causing offence to be falsely accused of doing so.

Figure 6A:
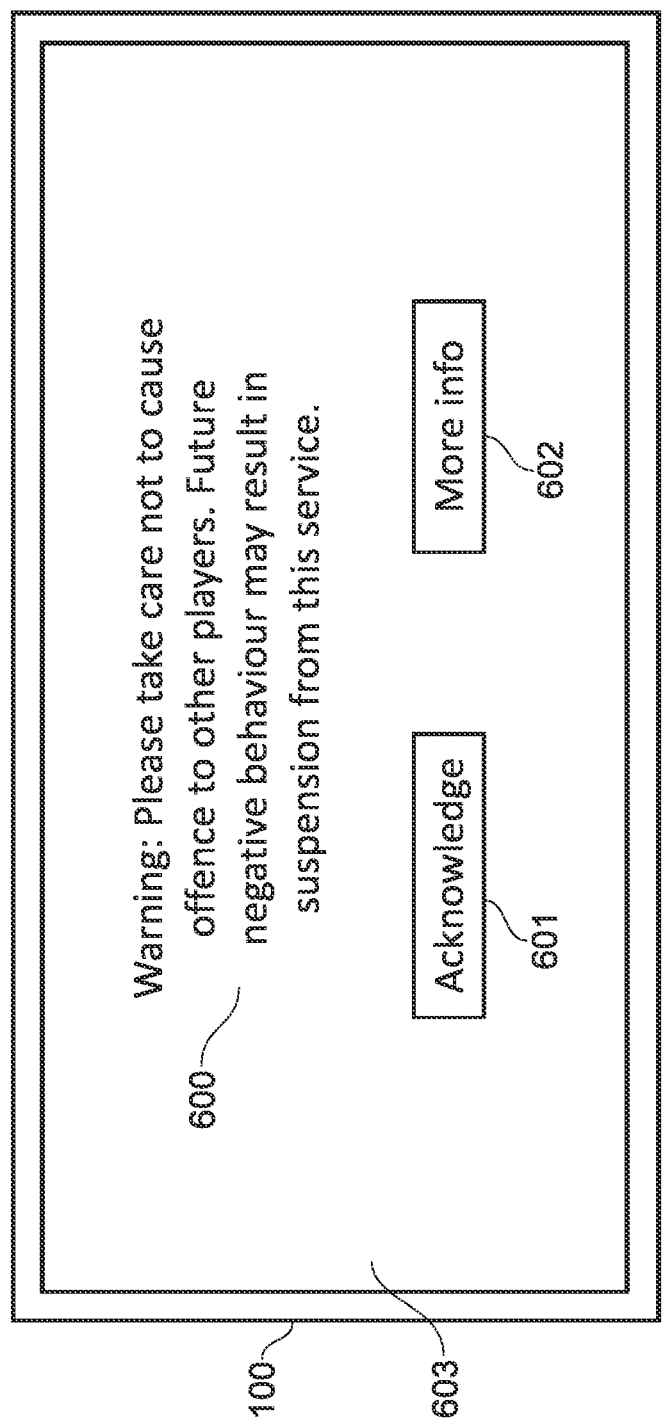
FIGS. 6A and 6B schematically show first example screens shown to a user.

FIG. 6A shows an example screen 603 displayed on the display device 100 of a user who is being reprimanded via a warning message. The games console of the user causes the screen 603 to be displayed in response to receiving a signal from the server 300 indicating the user is to be reprimanded. The screen includes a textual warning message 600 together with an "Acknowledge" virtual button 601 and a "More info" virtual button 602. In this example, the warning message asks the user to take care not to cause offence to other users and warns them that future negative behaviour may result in them being suspended from the service (e.g. the online game).

The server 300 may keep a record (e.g. in storage medium 304) of reprimands provided to a user over a predetermined time period (e.g. one day, three days, one week, one month or the like) and provide a more severe reprimand for repeated instances of recorded abuse. For example, for a first recorded instance of abuse, the user may be provided with an initial warning message (such as the message 600). For a second recorded instance of abuse within the predetermined time period, the user may be provided with a final warning message (indicating the next instance of identified abuse will result in the user's account being suspended). Finally, for a third recorded instance of abuse within the predetermined time period, the user is suspended from the service.

In each case, a screen like screen 603 may be displayed with a message 600 indicating the reprimand. For the first and second reprimands (which do not lead to suspension from the service), the user may select the "Acknowledge" virtual button 601 (e.g. using controller 140) to return to the online game. This indicates that the user has acknowledged the reprimands. For the third reprimand, however, selecting the "Acknowledge" virtual button 601 causes the user to leave the online game (e.g. causing them to return to a home screen of the online video game application). The user is then unable to join the online game due to their suspension. The suspension may be temporary (e.g. for a predetermined time period such as one day, three days, one week, one month or the like) or permanent.

Other types of reprimand are also envisaged. For example, in addition to a user being warned with a warning screen such as screen 603, a user may also be provided with in-game consequences for abusive behaviour. For example, the user's controls in an online game (e.g. control of a character, vehicle or the like) may be subject to a predetermined delay (e.g. so the time between the user providing an input on the controller 140 and this resulting in a corresponding output in the game is delayed, e.g. by 0.25 or 0.5 seconds). This makes the game more difficult and less enjoyable for the user and thereby incentivises them to reduce the abusive behaviour. Such in-game control delays may be temporary (e.g. lasting 10, 20 or 30 seconds) with the amount of time over which they apply depending on factors such as the offensiveness of an abusive phrase and/or the number of times in the game the player has previously been reprimanded.

In an example, the suspension is implemented by the server 300. For instance, in order to join an online session of the online game, a request comprising the unique identifier (e.g. username) of the user must be transmitted from a user's games console to the server 300. The server 300 keeps a suspension record (e.g. in the storage medium 304) of the respective unique identifiers of users who are currently suspended from the service. If the unique identifier of a requesting user does not appear on the suspension record, the server 300 allows access to the online game in response to the request. However, if the unique identifier of a requesting user does appear on the suspension record, the server 300 denies access to the online game in response to the request (and the user is informed accordingly).

Figure 6B:
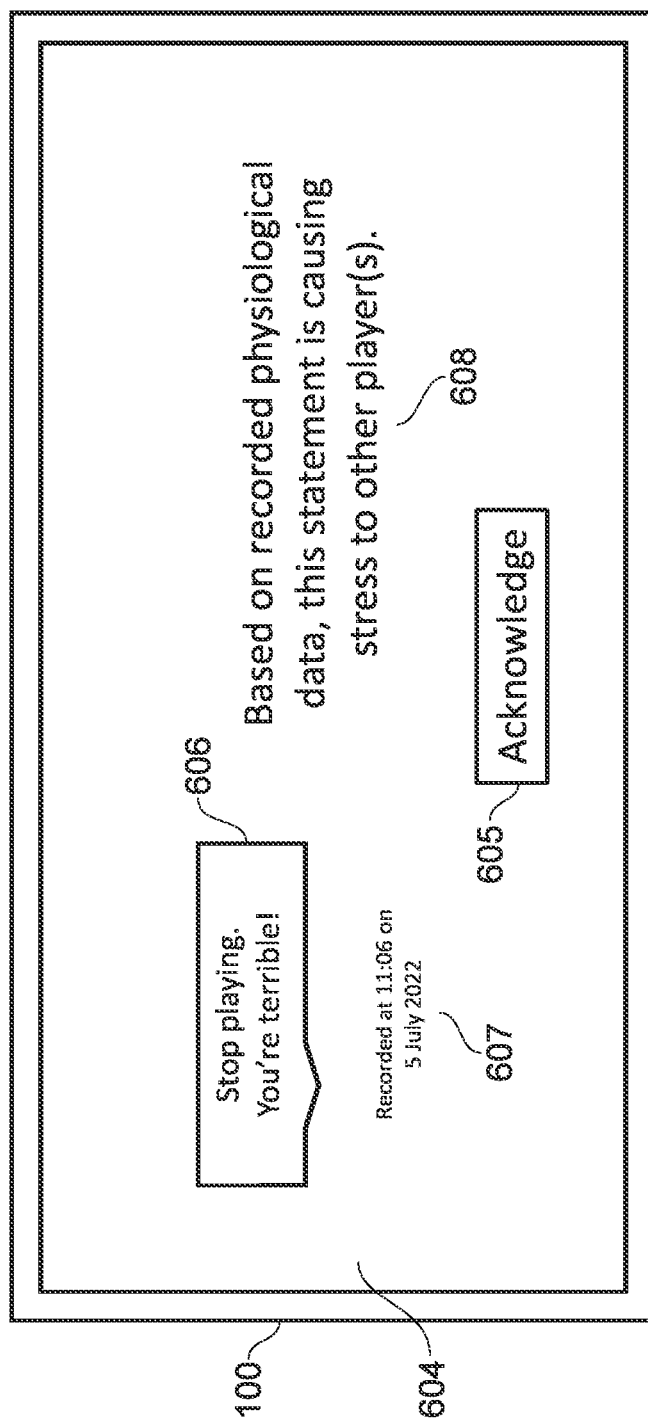

In response to the user selecting the "More info" virtual button 602, the screen 604 exemplified in FIG. 6B is displayed. This provides information to the user explaining why they have been subject to the reprimand. This information is provided to the games console of the reprimanded user by the server 300 with the signal indicating the user is to be reprimanded (and which causes display of the screen 603), for example. FIG. 6B exemplifies User A being reprimanded based on their utterance of the phrase 400 and the negative effect it seems to have had on Users B and C (as discussed, the sudden increase in the heart rate of Users B and C following utterance of the phrase 400 indicates the phrase 400 has caused stress to Users B and C).

In this example, the screen 604 includes a textual version 606 of the offensive phrase 400 (e.g. as generated by the speech-to-text program 502 at the server 300) so the reprimanded user is aware of the phrase which has caused offence. Time information 607 (e.g. based on the timestamp of the offensive phrase 400) is also provided indicating when the offensive phrase was uttered. The screen 604 also includes a textual explanation 608 of why the user has been reprimanded based on the phrase. In this example, the user is informed that, based on the recorded physiological data of other players in the online game, the phrase 400 (which may also be referred to as a statement) has caused stress to other players. The recorded physiological data of the other players in the online game itself may be displayed instead of or in addition to the textual information 608. The user may select the "Acknowledge" virtual button 605 to return to the screen 603 exemplified in FIG. 6A.

Thus, as well as enabling more information to be taken into account when determining whether or not to reprimand a user for abuse (thereby helping ensure reprimands are fairer and more consistently applied), the present technique also ensures this information is made available to a reprimanded user. This allows a reprimanded user to understand why they have been reprimanded and helps improve the likelihood they will change their behaviour in the future. The technical solution of the present technique thus helps reduce online abuse of users of multi-user online content and improve the online experience of all users.

In the above examples, uttered phrases and physiological information of users interacting with each other during an online gaming session are monitored by the server 300 (and, optionally, a human moderator with access to the server 300) at all times throughout the session. In another example, however, the uttered phrases and physiological information during the session are recorded by the server 300 (and/or the games console of each user) but not monitored. At the end of the online session, each user is then requested to give feedback on the conduct of other users during the online game. Only if any user (or a predetermined number or proportion of users) provides negative feedback are the uttered phrases and physiological information then classified and associated and used to generate an appropriate reprimand by the server 300.

This helps reduce unnecessary processing at the server 300, since the processing of uttered phrases and physiological information is only carried out if required (based on one or more users providing negative feedback). Furthermore, in an example, the uttered phrases and physiological information of a session are initially recorded only locally at the games console of each user (with each games console recording the uttered phrases and physiological information of its respective user during the session). Only if any user provides negative feedback about the session is data indicative of the uttered phrases and physiological information transmitted to the server 300 (e.g. based on a request transmitted to the relevant games consoles by the server 300). This helps reduce unnecessary using of network bandwidth, since the transmission of data representing the uttered phrases and physiological information is only carried out if necessary (based on one or more users providing negative feedback).

In an example, the period of time over which an online session occurs may be the same for all users. For example, the online session may correspond to a multiplayer online game with a predetermined length (such as a time-limited race or battle game). In this case, the online session is defined by a start time and an end time which is the same for all users. In another example, the period of time over which an online session occurs may be different for different users. For example, in an open world multiplayer online game, users may enter and leave the game at different times. In this case, each user has their own respective online session defined by a start time (when the user enters the game) and end time (when the user leaves the game) defined for each user. In either case, since the data indicating uttered phrases and physiological information of each user is timestamped (with a timestamp including, for instance, the time and date at which the data is recorded on the disk 50 of the relevant games console according to a clock (e.g. an online clock) synchronised across all games consoles), the association between the uttered phrases of one user and the physiological information of other user(s) and the generation of appropriate reprimand(s) may still be carried out for either type of online session.

Figure 7:
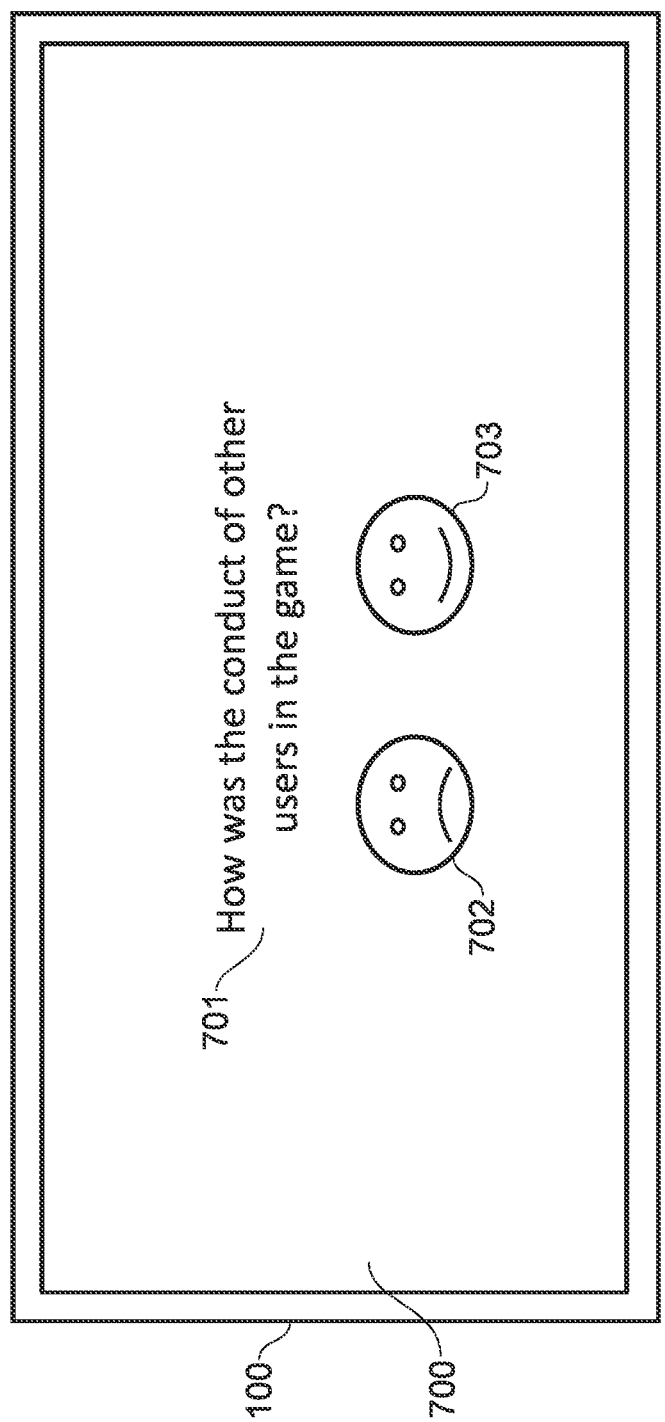
FIG. 7 schematically shows a second example screen shown to a user.

FIG. 7 shows an example feedback screen 700 displayed on the display device 100. The games console 110 causes the feedback screen to be displayed once an online session ends for a given user (e.g. after an online session of a predetermined length ends or when a user chooses to leave an online session). The feedback screen includes a textual message 701 asking the user about the conduct of other players in the game. A first virtual button 702 indicates negative feedback due to a problem with the conduct (e.g. negative or offensive conduct). A second virtual button 703 indicates positive feedback due to no problem with the contact.

Selection of the first virtual button 702 causes a signal indicating negative feedback to be transmitted to the server 300. In an example, each online session is associated with a unique session identifier (session ID) by the server 300. The server 300 also records the user identifier of each user involved in the session (for example, all users who were able communicate with each other during the session via their respective headsets) and associates these user identifiers with the session ID. A negative feedback signal from a user to the server may comprise the session ID. In response, the server looks up the session ID, determines the user identifiers associated with the session ID and performs the analysis of the data indicative of the uttered phrases and physiological information associated with those user identifiers and recorded during the identified session in order to determine whether reprimand(s) to any user(s) are applicable.

Selection of the second virtual button 703, on the other hand, results in no signal indicating negative feedback to be transmitted to the server 300. After selection of the first or second virtual buttons 702 or 703, the user is able to proceed with, for example, a new online session or the like in the usual way.

To use the example of FIGS. 4A and 4B, for example, User B may join an online open world game in which Users A and C are already involved. By joining the game, User B starts a new online session which is then associated with a unique session ID [X] created by the server 300. A start time of the session (e.g. the date and time at which User B joins the game) is recorded by the server and associated with [X].

By joining the game, Users A and C are able to communicate with User B via the headsets 306A, 306B and 306C. The unique user identifiers of each of Users A, B and C are therefore recorded as being associated with [X] by the server 300.

At the end of the session (e.g. when User B subsequently leaves the game), an end time of the session (e.g. the date and time at which User B leaves the game) is recorded by the server and associated with [X]. Furthermore, the server 300 causes User B to be presented with the feedback screen 700.

If the User B does not provide negative feedback (by selecting the second virtual button 703), no further action is taken. However, if User B does provide negative feedback (by selecting the first virtual button 702), a signal is transmitted to the server 300 indicating the negative feedback and indicating the session ID [X].

In response to the negative feedback signal, the server 300 obtains the unique user identifiers of Users A, B and C (since these are associated with [X]). The server 300 also obtains the start and end times of the session with session ID [X]. The server 300 then obtains and processes the data indicative of uttered phrases and physiological information recorded for each of Users A, B and C with a timestamp occurring between the start and end times of the session with session ID [X]. This data is classified and associated in the way previously described, for example.

Any detected abuse is then reprimanded. For example, in the case of FIG. 4B, the physiological information of Users B and C (heart rate, in this example) indicates that stress was caused by the uttered phrase 400 of User A. User A may therefore be reprimanded accordingly.

The use of feedback in this way also helps address the incorrect reporting of abusive behaviour of users, since negative feedback does not immediately result in a player being reprimanded but, rather, causes a procedure in which data indicative of uttered phrases and physiological information is analysed (that is, classified and associated, as described) by the server 300 to determine whether abusive behaviour has occurred or not. Only if abusive behaviour has occurred is the relevant player then reprimanded (and, as discussed, they will be provided with information about why they have been reprimanded). This helps address the problem of the abuse reporting system itself being abused. For example, in the case of FIG. 4A, the physiological information of Users B and C (heart rate, in this example) indicates that no stress was caused by the uttered phrase 400 of User A. It may therefore be appropriate for User A not to be reprimanded, despite the negative feedback provided by User B. In situations in which negative feedback results in no user being reprimanded (e.g. due to a lack of physiological indicators of stress in other users), this may always be referred by the server 300 to a human moderator for review before a final decision on a reprimand is made. This helps ensure quality control of recommended reprimands and helps ensure abusive behaviour which may not be picked up based on physiological information can still be dealt with appropriately.

Figure 8:
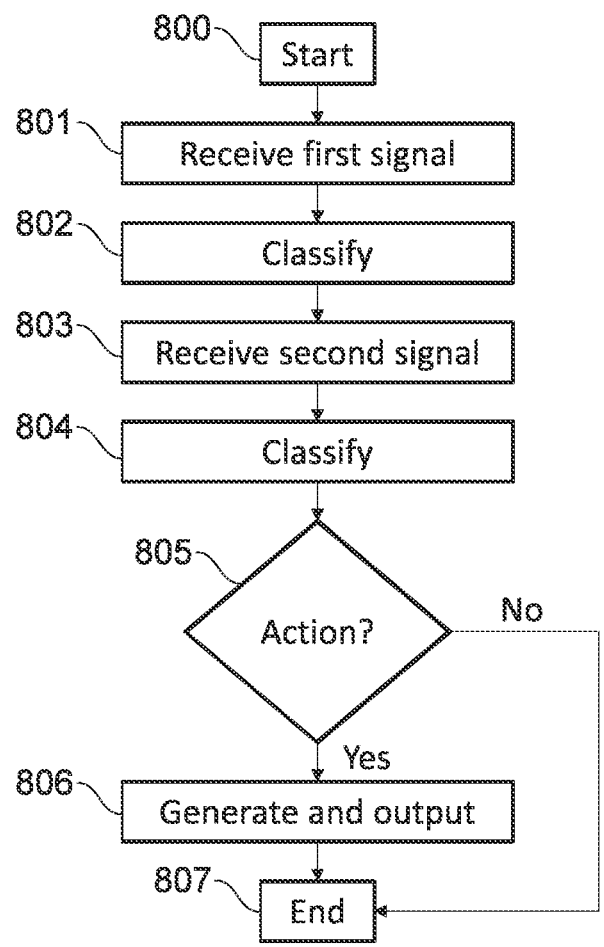
FIG. 8 shows an example method.

A data processing method according to the present technique is shown in FIG. 8. The method is a computer-implemented method carried out by circuitry of a data processing apparatus (e.g. the processor 302 of the server 300). The method starts at step 800. At step 801, a first signal is received (e.g. by communication interface 301). The first signal is indicative of one or more words (e.g. phrase 400) communicated from a first user of online content (e.g. User A) to one or more second users of online content (e.g. Users B and C). The first signal may represent a digital audio recording of the one or more words as uttered by the first user (e.g. as detected by the microphone of the headset 307A) or may represent the words in textual form. At step 802, the one or more words are classified using the first signal (e.g. using step 503 and, optionally, step 502 described in FIG. 5).

At step 803, one or more second signals are received (e.g. by communication interface 301). The one or more second signals are indicative of one or more physiological characteristics of the one or more second users in response to the communicated one or more words. The one or more physiological characteristics of the one or more second users comprise, for example, a value of one or more measured physiological parameters of the one or more second users. Data indicative of the physiological parameter value(s) of the one or more second users is represented by respective ones of the one or more second signals. Examples of such physiological parameter value(s) are heart rate and/or perspiration level (e.g. as detected by fitness trackers 306B and 306C).

At step 804, the one or more physiological characteristics of the one or more second users are classified using the second signal (e.g. using step 506 of FIG. 5). At step 805, it is determined, based on a classification of the one or more words (e.g. "offensive" or "inoffensive") and a classification of the one or more physiological characteristics of the one or more second users (e.g. "stressed" or "non-stressed"), whether to generate an action signal. The action signal indicates that an action associated with the first user of the online content is to be taken.

If it is determined not to generate an action signal (e.g. because the one or more words are classified as "inoffensive" or because the one or more words are classified as "offensive" but the one or more physiological characteristics of none of the one or more second users are associated with a classification of "stressed"), the method ends at step 807.

If it is determined to generated an action signal (e.g. because the one or more words are classified as "offensive" and the one or more physiological characteristics of at least a portion of the one or more second users are associated with a classification of "stressed"), the method proceeds to step 806 in which the action signal is output and generated.

In one example, the action signal is output to a user interface (e.g. user interface 305) to cause the user interface to indicate the one or more words and/or information associated with the one or more physiological characteristics of the one or more second users to a human moderator (who then decides whether action should be taken). Information associated with the one or more physiological characteristics of the one or more second users comprises, for example, the data indicative of the one or more physiological characteristics itself or a summary of what the data shows (e.g. the textual explanation 608).

In another example, the action signal is transmitted to a second data processing apparatus associated with the first user (e.g. games console 110A) to cause the second data processing apparatus to implement the action. In this case, no human moderator is required. The method ends at step 807.

Figure 9:
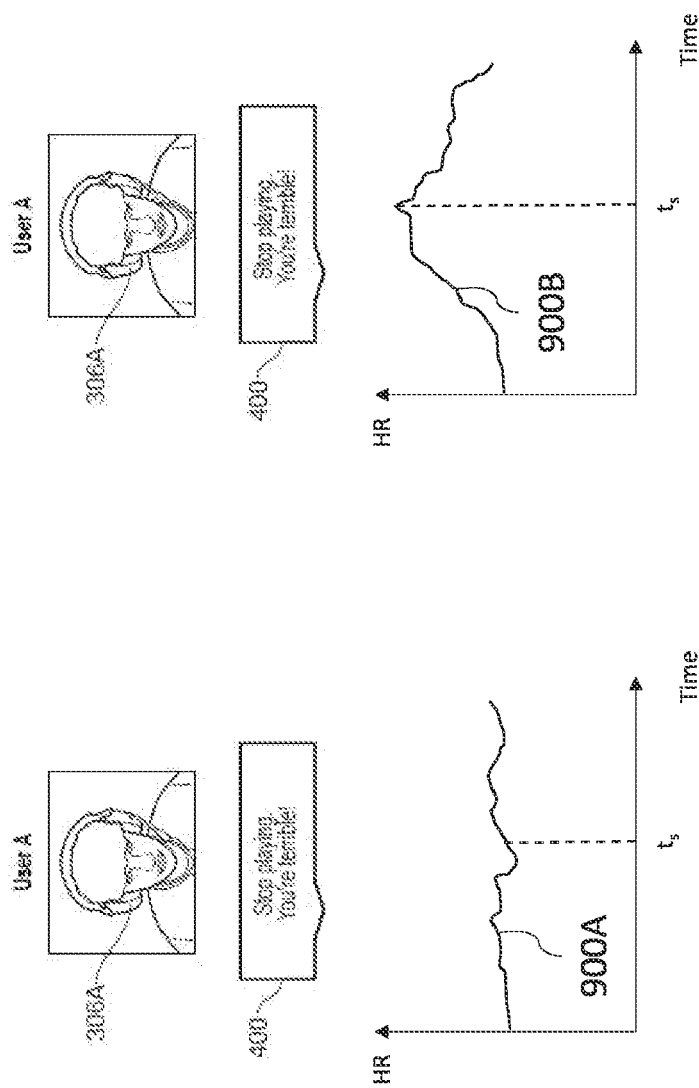
FIGS. 9A and 9B illustrate further example situations occurring during implementation of multiple user online content.

FIGS. 9A and 9B demonstrate a variation of the above examples. In this variation, only the physiological data of the speaking user is used to determine whether or not they are likely to be engaging in abuse of other players (and, if applicable, the extent of the abuse). This is beneficial in that the amount of physiological data which needs to be processed and/or communicated over the network 308 is reduced. It also allows, for example, the intent of a player using potentially abusive language to be inferred, thereby allowing an appropriate reprimand for the player to be determined so that abusive behaviour is discouraged.

In FIGS. 9A and 9B, two examples of User A using the same phrase 400 ("Stop playing. You're terrible!") are given. In the first example of FIG. 9A, User A's heart rate (shown by graph 900A) remains relatively stable at the point in time is at which they begin uttering the phrase 400. This indicates User A remains relatively relaxed as they speak the phrase 400 and thus it may be determined, for example, that User A is saying the phrase in a way which is not intended to cause offence to other users. In this case, a reprimand may not be appropriate for User A (or, if there is a reprimand, it should be relatively mild in severity). On the other hand, in the second example of FIG. 9B, User A's heart rate (shown by graph 900B) increases relatively quickly and, in fact, peaks at the point in time is at which they begin uttering the phrase 400. This indicates User A has experienced an increase in stress, frustration or anger as they speak the phrase 400 and thus it may be determined, for example, that User A is saying the phrase in a way which is intended to cause offence to other users. In this case, a reprimand may be appropriate for User A (or, if there was previously a mild reprimand for a relaxed utterance of phrase 400, a more severe reprimand may be appropriate).

This is only a simplified example and, in reality, multiple monitored physiological parameters of the speaking User A may be used to determine the extent to which an uttered phrase classified as offensive is intended to be offensive to other users and to determine an appropriate reprimand (if any) for User A. FIG. 10 shows an example in which two monitored physiological parameters, namely heart rate and facial expression are used, together with the phrase classification of FIG. 5. In this example, input phrases are classified into "inoffensive", "slightly offensive" and "highly offensive" classes, for example. No action is taken for phrases classified as "inoffensive". However, for phrases classified as "slightly offensive" or "highly offensive", action is taken according to the lookup table of FIG. 10.

In the first example, the phrase is classified as "slightly offensive". However, User A's heart rate at the point utterance of the phrase begins is below a predefined threshold of 120 bpm (chosen to be high enough to account for increased excitement in the video game but low enough to indicate User A is not excessively stressed, frustrated or angry) and their classified facial expression (classified using the trained CNN described earlier, for example) is "Relaxed". In this case, it is determined that offence was not intended by the user. No action is therefore taken against the user.

In the next example, the phrase is again classified as "slightly offensive". However, User A's heart rate at the point utterance of the phrase begins is now above the predefined threshold of 120 bpm (indicating the user's stress has increased). Their classified facial expression, however, remains "Relaxed". In this case, it is determined that offence may not currently be intended by the user but that, due to their increased stress, they are in danger of potentially causing offence. A "Tier 1" warning is therefore provided to the user. The "Tier 1" warning is described later.

In the next example, the phrase is again classified as "slightly offensive" and User A's heart rate at the point utterance of the phrase begins is again above the predefined threshold of 120 bpm (indicating the user's stress has increased). This time, however, their classified facial expression is "Angry". In this case, due to the stress and anger of the user, it is determined that offence is intended by the user. A "Tier 2" warning is therefore provided to the user. The "Tier 2" warning is described later but, in general, is more severe that a "Tier 1" warning.

In the next example, the phrase is classified as "highly offensive" (rather than only "slightly offensive". However, User A's heart rate at the point utterance of the phrase begins remains below the predefined threshold of 120 bpm and their classified facial expression remains as "Relaxed". In this case, it is determined that, based on the physiological parameters (that is, heart rate and facial expression), offence was unlikely to be intended by the user. However, due to the phrase being classified as "highly offensive", they are still in danger of potentially causing offence. A "Tier 1" warning is therefore provided to the user.

In the next example, the phrase is again classified as "highly offensive". However, User A's heart rate at the point utterance of the phrase begins is now above the predefined threshold of 120 bpm (indicating the user's stress has increased). Their classified facial expression, however, remains "Relaxed". In this case, due to the "highly offensive" classification of the phrase combined with the user's increased stress, it is determined that the danger of causing offence is further increased. A "Tier 2" warning is therefore provided to the user.

In the final example, the phrase is again classified as "highly offensive" and User A's heart rate at the point utterance of the phrase begins is again above the predefined threshold of 120 bpm (indicating the user's stress has increased). This time, however, their classified facial expression is "Angry". In this case, due to the stress and anger of the user and the "highly offensive" nature of the phrase, it is determined that offence is intended by the user. Furthermore, since the phrase is not merely "slightly offensive" but instead "highly offensive", the most severe consequence of "suspension" is implemented. This causes the user's access to the content to be temporarily or permanently suspended.

FIG. 10 is a simplified example to demonstrate some of the principles of the present technique. In a more comprehensive example, a larger number of physiological characteristics may be used with a suitably trained classifier (e.g. the classifier 506 of FIG. 5 trained with alternative training data associated with the likely intention of a user to cause offence rather than with the extent to which a user is likely to be offended). For example, the classifier may take into account one or more types of physiological information simultaneously and use this to generate a physiological information classification indicating the extent to which a user is likely to intend to offend other users. This physiological information classification can then be used with the phrase classification to determine whether or not action should be taken against a particular user and, optionally, the extent to which action should be taken.

For example, the physiological information classification may take one of "no offence intended", "offence slightly intended" and "offence highly intended". These classifications may then be used with the phrase classification (e.g. "inoffensive", "slightly offensive" and "highly offensive") to determine in appropriate action. Each phrase classification and physiological information classification combination may be associated with a corresponding action. So, for example, the combination of "no offence intended" and a "slightly offensive" phrase would be associated with a less severe action than the combination of "offence highly intended" and a "highly offensive" phrase. This may be implemented using a lookup table like that shown in FIG. 10 but in which the columns indicating "Heart Rate" and "Facial expression classification" are replaced with a single column indicating "Physiological information classification", for example.

In an example, the physiological information classifier (e.g. classifier 506) is again a suitably trained machine learning model (e.g. an artificial neural network (ANN)) which is able to take one or more types of physiological information and generate a physiological information classification based on that physiological information. For instance, the classifier may receive heart rate data and perspiration data of a user recorded over a predetermined time period during which a classified phrase is uttered and data indicating a classification of a facial expression of the user in an image captured at a certain time within that predetermined time period. For example, the predetermined time period may be 10 seconds including 5 seconds before the utterance of the phrase begins and 5 seconds after the utterance of the phrase begins and the captured image on which the facial expression classification is applied may be captured at the beginning of the predetermined time period. The classifier may have been previously trained using a training set of a number (e.g. 5,000) of instances of captured heart rate data, perspiration data and facial expression classification data and corresponding manually labelled classifications (e.g. "no offence intended", "offence slightly intended" and "offence highly intended"), for example.

In an example, during an online game, data indicative of phrases uttered by a user during the game (e.g. textual data or a digital audio recording) is timestamped with the time at which the data was recorded (corresponding to the time is at which utterance of the phrase began, for example) by the user's games console 110 and transmitted to the server 300 with the timestamp and a unique identifier of the user (e.g. a unique username of the user previously registered at the server 300). Similarly, physiological information detected for the user during the game (e.g. heart rate data, perspiration data and/or a captured image of a facial expression of the user) is timestamped with the time at which the data was recorded by the user's games console 110 and transmitted to the server 300 with the timestamp and the unique identifier of the user.

Each uttered phrase is then classified by the sever to determine a level of offensiveness of the phrase. The physiological information with a timestamp within a predetermined time period with the start of the utterance of the phrase as a mid-point (e.g. a 10 second predetermined time period extending for 5 seconds before and after the start of the utterance of the phrase) is also classified by the server to determine a level of intent associated with the physiological information. The classification of the physiological information is then associated with the classification of the uttered phrase. This is then used to determine the extent (if any) to which the user should be reprimanded.

Thus, for example, if the timestamp is of an uttered phrase by a user is 10:04:48 (10 hours, 4 minutes, 48 seconds) and the predetermined time period is 10 seconds, then the classification of all physiological information recorded for the user with a time stamp between 10:04:44 and 10:04:53 will be associated with the classification of the uttered phrase. The user will then be reprimanded to an extent (if any) depending on the combination of the uttered phrase and the physiological information classification, as previously described.

As previously described, reprimands may be implemented automatically or upon confirmation by a human moderator. Furthermore, due to the recording of the uttered phrase and the recording of physiological information associated with the user (e.g. at the server which performs the classification and/or on the games console 110 itself), the reprimand provided to the user may include information to help the user understand why they are being reprimanded for certain behaviour. Transparency is therefore improved. This is exemplified in FIGS. 11A-B and 12A-B, which show "Tier 1" and "Tier 2" warnings, respectively, and how the present disclosure provides improved transparency regarding these warnings. The examples of FIGS. 11A-B and 12A-B are implemented in a similar way to the example of FIGS. 6A-B, for example.

Figure 11A:
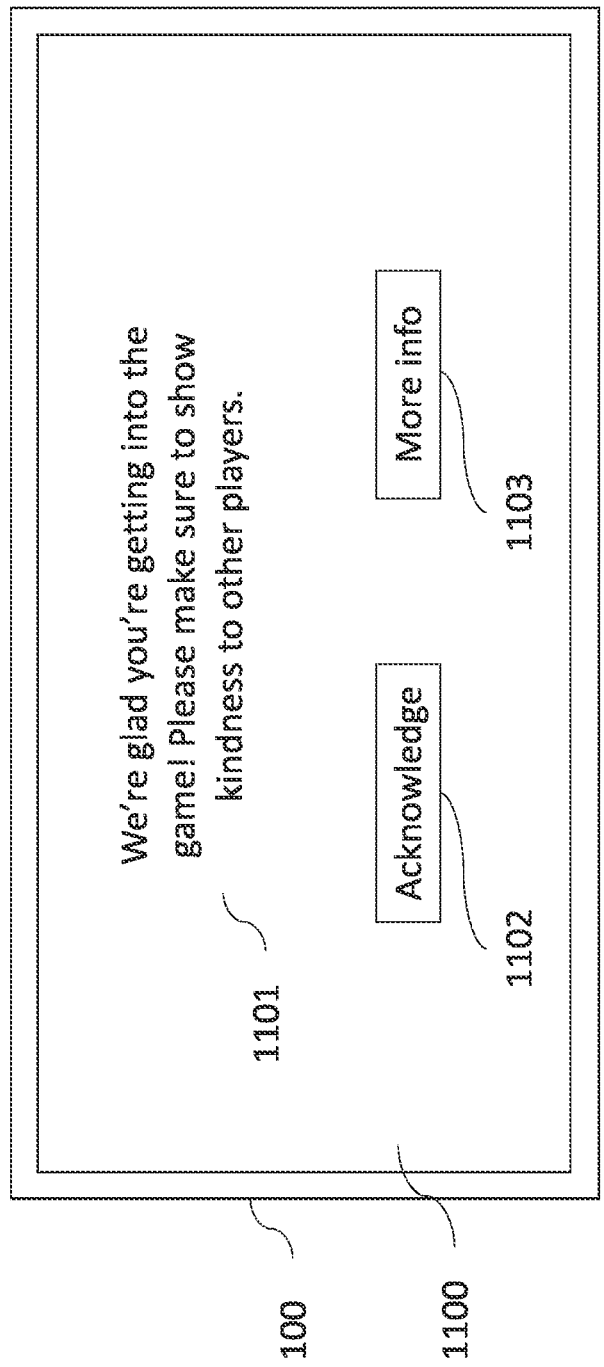
FIGS. 11A and 11B schematically show second example screens shown to a user.

FIG. 11A shows an example screen 1100 displayed on the display device 100 of a user who is being reprimanded via a "Tier 1" warning. The games console of the user causes the screen 1100 to be displayed in response to receiving a signal from the server 300 indicating the user is to be reprimanded with a "Tier 1" warning. The screen includes a textual warning message 1101 together with an "Acknowledge" virtual button 1102 and a "More info" virtual button 1103. In this example, because the warning is a less severe "Tier 1" warning, the warning message 1101 is informal in style and simply reminds the user to show kindness to other players.

Figure 11B:
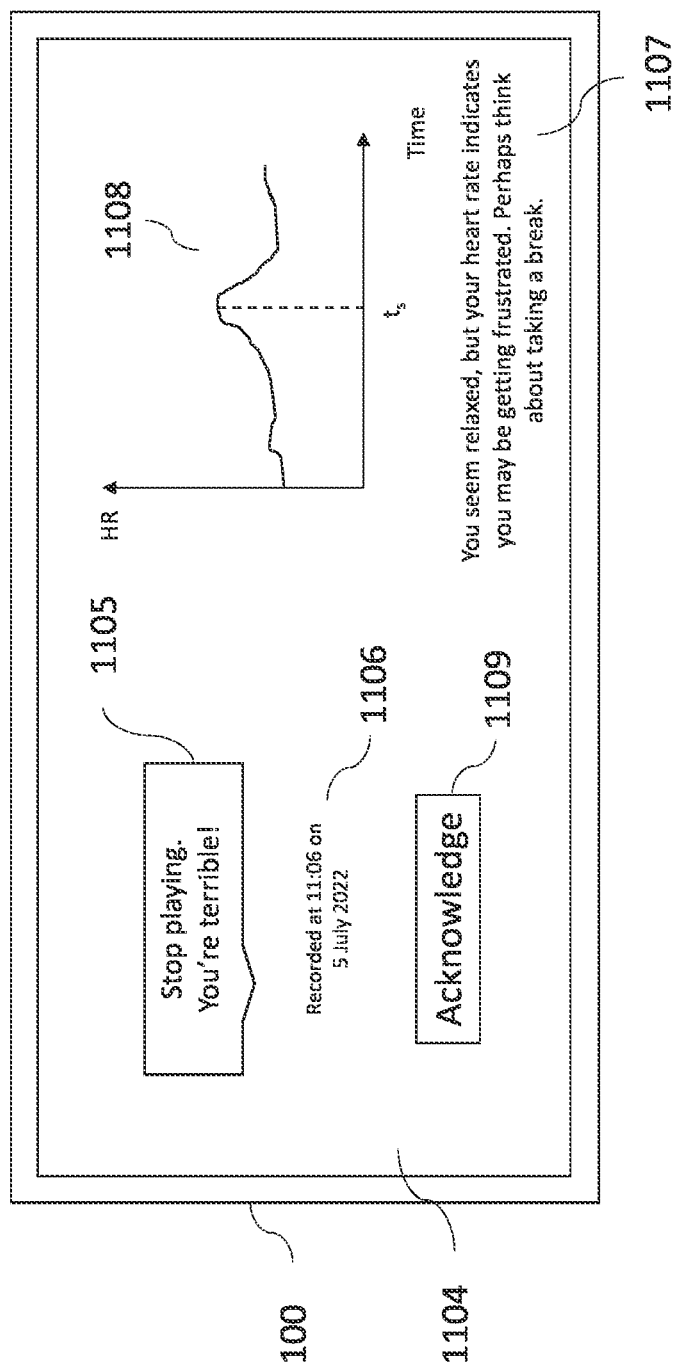

The user may select the "Acknowledge" virtual button 1102 (e.g. using controller 140) to return to the online game. This indicates that the user has acknowledged the reprimand. If the user selects the "More info" virtual button 1103, the screen 1104 exemplified in FIG. 11B is displayed. This provides information to the user explaining why they have been subject to the reprimand. This information is provided to the games console of the reprimanded user by the server 300 with the signal indicating the user is to be reprimanded (and which causes display of the screen 1100), for example.

FIG. 11B exemplifies User A being reprimanded by a "Tier 1" warning based on their utterance of the phrase 400 (classified as "slightly offensive", for example), the fact that their heart rate was more than 120 bpm at the time utterance of the phrase 400 began (at time $t_s$) and the fact that their facial expression was classified as "Relaxed" (see again the lookup table of FIG. 10). Information based on this is provided to the user via the screen 1104. In particular, textual information 1105 indicating the detected phrase 400 is displayed together with textual information 1106 indicating a timestamp of the detected phrase (e.g. the time $t_s$). A graphic 1108 indicating the user's heart rate (e.g. over a predetermined time period starting 5 seconds before t s and ending 5 seconds after $t_s$) is also provided, as is textual information 1107 indicating the user seems relaxed (based on their classified facial expression) but that their increased heart rate indicates they may be getting frustrated and thus they should think about taking a break from play. The user may select the "Acknowledge" virtual button 1109 to return to the online game.

Figure 12A:
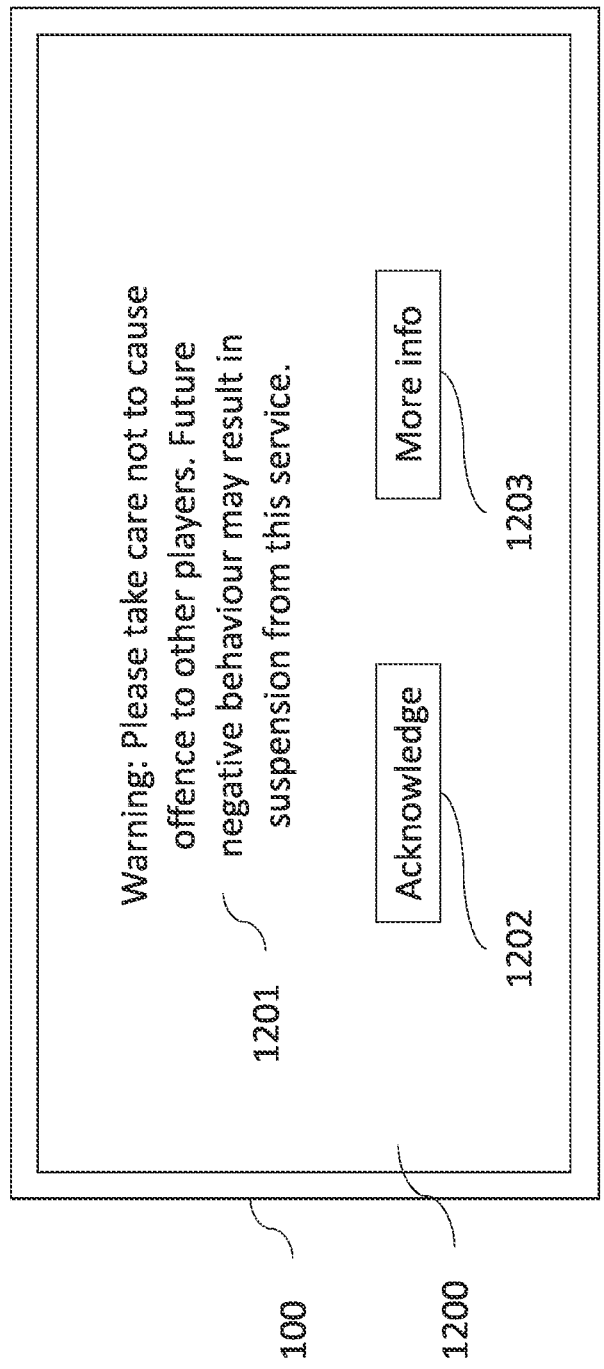
FIGS. 12A and 12B schematically show third example screens shown to a user.

FIG. 12A shows an example screen 1200 displayed on the display device 100 of a user who is being reprimanded via a "Tier 2" warning. The games console of the user causes the screen 1200 to be displayed in response to receiving a signal from the server 300 indicating the user is to be reprimanded with a "Tier 2" warning. The screen again includes a textual warning message 1201 together with an "Acknowledge" virtual button 1202 and a "More info" virtual button 1203. In this example, because the warning is a more severe "Tier 2" warning, the warning message 1201 is more formal in style and simply reminds the user that it is not acceptable to cause offence to other players and that future negative behaviour may result in them being suspended from the online game.

Figure 12B:
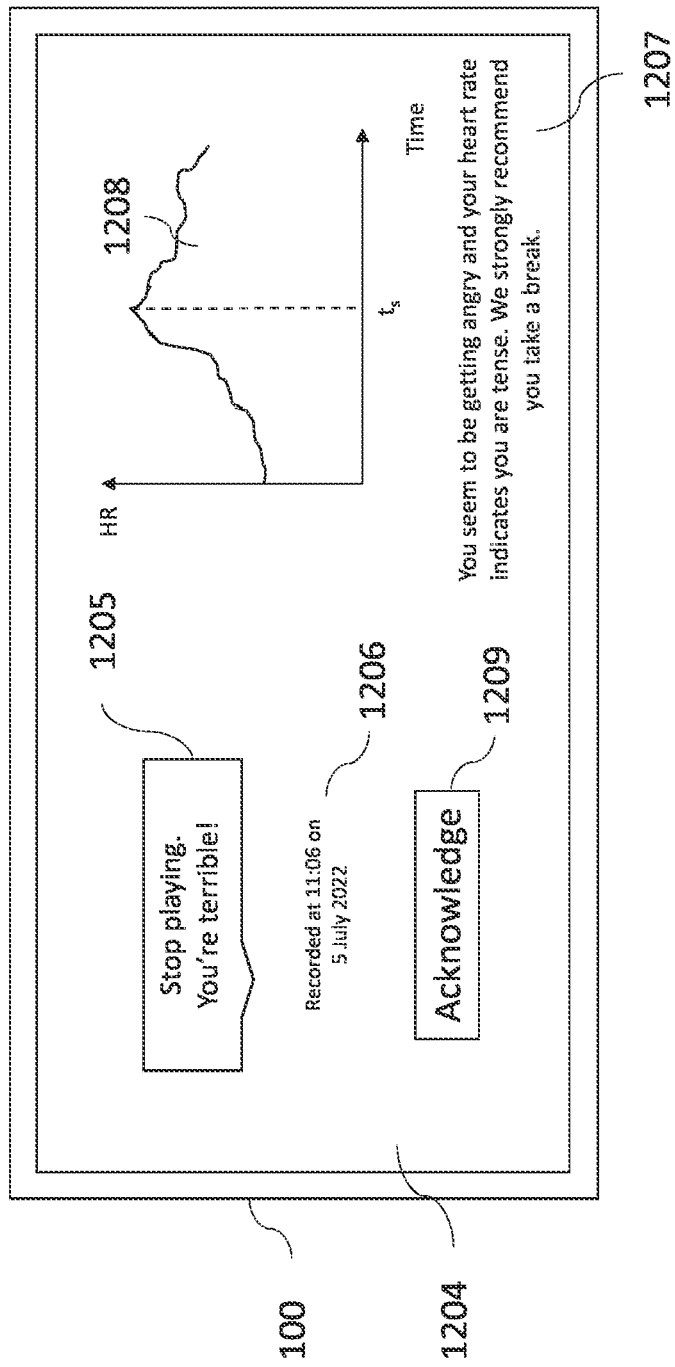

The user may again select the "Acknowledge" virtual button 1202 (e.g. using controller 140) to return to the online game. This indicates that the user has acknowledged the reprimand. If the user selects the "More info" virtual button 1203, the screen 1204 exemplified in FIG. 12B is displayed. This provides information to the user explaining why they have been subject to the reprimand. This information is provided to the games console of the reprimanded user by the server 300 with the signal indicating the user is to be reprimanded (and which causes display of the screen 1200), for example.

FIG. 12B exemplifies User A being reprimanded by a "Tier 2" warning based on their utterance of the phrase 400 (classified as "slightly offensive", for example), the fact that their heart rate was more than 120 bpm at the time utterance of the phrase 400 began (at time $t_s$) and the fact that their facial expression was classified as "Angry" (see again the lookup table of FIG. 10). Information based on this is provided to the user via the screen 1204. In particular, textual information 1205 indicating the detected phrase 400 is displayed together with textual information 1206 indicating a timestamp of the detected phrase (e.g. the time $t_s$). A graphic 1208 indicating the user's heart rate (e.g. over a predetermined time period starting 5 seconds before t s and ending 5 seconds after $t_s$) is also provided, as is textual information 1207 indicating the user seems angry (based on their classified facial expression) and that their increased heart rate indicates they are tense. The user is furthermore strongly encouraged to take a break from play. The user may select the "Acknowledge" virtual button 1209 to return to the online game.

The server 300 may again keep a record (e.g. in storage medium 304) of reprimands provided to a user over a predetermined time period (e.g. one day, three days, one week, one month or the like) and provide a more severe reprimand for repeated instances of recorded abuse. For example, for a first recorded instance of abuse determined to be associated with a "Tier 1" warning, the user may be provided with a "Tier 1" warning. For a second recorded instance of such abuse within the predetermined time period (even if the abuse would still normally be associated with a "Tier 1" warning), the user may be provided with a "Tier 2" warning (indicating the next instance of identified abuse will result in the user's account being suspended). Finally, for a third recorded instance of such abuse within the predetermined time period (again, even if the abuse would still normally be associated with a "Tier 1" warning), the user may be suspended from the service. In an example, gradual increase of reprimand severity for repeated instances of abuse within a predetermined time period may only be applied to more severe instances of abuse (e.g. those associated with a "Tier 2" warning or above).

Again, other types of reprimand are envisaged. For example, in addition to a user being warned with a warning screen such as screens 1100 or 1200, a user may also be provided with in-game consequences for abusive behaviour. For example, the user's controls in an online game (e.g. control of a character, vehicle or the like) may be subject to a predetermined delay (e.g. so the time between the user providing an input on the controller 140 and this resulting in a corresponding output in the game is delayed, e.g. by 0.25 or 0.5 seconds). This makes the game more difficult and less enjoyable for the user and thereby incentivises them to reduce the abusive behaviour. Such in-game control delays may be temporary (e.g. lasting 10, 20 or 30 seconds) with the amount of time over which they apply depending on factors such as the offensiveness of an abusive phrase and/or the number of times in the game the player has previously been reprimanded. For example, abuse associated with a "Tier 1" warning may be subject to an in-game control delay of 5 seconds whereas abuse associated with a "Tier 2" warning may be subject to an in-game control delay of 10 seconds.

As with the detection of abuse based on measured physiological characteristic(s) of other users (rather than the speaking user), monitoring of a speaking user's phrases and physiological characteristic(s) may be monitored at all times throughout a gaming session or may be recorded but only analysed in response to feedback from another user (e.g. as described with reference to FIG. 7).

It will also be appreciated that the physiological characteristic(s) of both the speaking user and other user(s) (e.g. as exemplified in FIGS. 4A and 4B) may be used to determine whether or not abuse has occurred. For example, this allows a user whose detected speech is shown to cause offence to other users (based on the physiological characteristic(s) of those users) and who, based on the physiological characteristic(s) of that user, intends to cause offence to other users to be reprimanded more severely than a user who is shown to cause offence to other users but who does not intend to cause such offence. In the former case, for example, the speaking user may be immediately suspended from play. However, in the latter case, for example, the speaking user may be provided with a "Tier 2" warning and only suspended from play if they continue to cause offence. Such a "Tier 2" warning may be enhanced in this case by including both information on other users (as exemplified in FIG. 6B, for example) and the speaking user (as exemplified in FIGS. 11B and 12B, for example) on a single screen (not shown).

A data processing method according to the present technique is shown in FIG. 13. The method is a computer-implemented method carried out by circuitry of a data processing apparatus (e.g. the processor 302 of the server 300). The method starts at step 1300.

At step 1301, a first signal is received (e.g. by communication interface 301). The first signal is indicative of one or more words (e.g. phrase 400) communicated from a first user of online content (e.g. User A) to one or more second users of online content (e.g. Users B and C). The first signal may represent a digital audio recording of the one or more words as uttered by the first user (e.g. as detected by the microphone of the headset 307A) or may represent the words in textual form.

At step 1302, the one or more words are classified using the first signal (e.g. using step 503 and, optionally, step 502 described in FIG. 5).

At step 1303, one or more second signals are received (e.g. by communication interface 301). The one or more second signals are indicative of one or more physiological characteristics of the first user within a time period of a start of the communication of the one or more words (e.g. a 10 second time period beginning 5 seconds before $t_s$ and ending 5 seconds after $t_s$). The one or more physiological characteristics comprise, for example, a value of one or more measured physiological parameters of the first user (e.g. heart rate and/or perspiration level as detected by fitness tracker 306A) and/or an image of a facial expression of the first user captured, for instance, by camera and microphone 120. Data indicative of the one or more physiological characteristics of the first user is represented by respective ones of the one or more second signals.

At step 1304, the one or more physiological characteristics are classified using the second signal (e.g. using step 506 of FIG. 5).

At step 1305, based on a classification of the one or more words (e.g. "inoffensive", "slightly offensive" or "highly inoffensive") and a classification of the one or more physiological characteristics (e.g. "no offence intended", "offence slightly intended" or "offence highly intended"), an action signal is generated.

The action signal indicates that an action associated with the first user of the online content is to be taken and indicates a characteristic of the action determined based on a combination of the classification of the one or more words and the classification of the one or more physiological characteristics. For example, based on the combination of the word and physiological characteristic combination, the action may be characterised as one of a plurality of types of warning (e.g. a "Tier 1" or "Tier 2" warning) or characterised as a "Suspension" (meaning the user is temporarily or permanently denied access to the online content).

At step 1306, the action signal is output.

In one example, the action signal is output to a user interface (e.g. user interface 305) to cause the user interface to indicate the one or more words and/or information associated with the one or more physiological characteristics of the first user to a human moderator (who then decides whether action should be taken). Information associated with the one or more physiological characteristics of the first user comprises, for example, the data indicative of the one or more physiological characteristics itself or a summary of what the data shows.

In another example, the action signal is transmitted to a second data processing apparatus associated with the first user (e.g. games console 110A) to cause the second data processing apparatus to implement the action. In this case, no human moderator is required.

The method ends at step 1307.

In an example in which one or more physiological characteristics of the one or more second users (e.g. Users B and C) are used to determine the characteristic of the action, the method may include the additional steps (e.g. occurring between steps 1304 and 1305) of receiving one or more third signals indicative of one or more physiological characteristics of the one or more second users in response to the communicated one or more words (e.g. heart rate and/or perspiration level of Users B and C as detected by fitness trackers 306B and 306C) and classifying the one or more physiological characteristics of the one or more second users using the one or more third signals (e.g. so each user can be classified as "stressed" or "non-stressed" in the way previously described). The characteristic of the action signal is then based on the combination of (a) the classification of the one or more words, (b) the classification of the one or more physiological characteristics of the first user and (c) the classification of the one or more physiological characteristics of the one or more second users.

Thus, the present technique enables more information (from a speaking user and/or other users) to be taken into account when determining whether or not to reprimand a particular user for abuse, if a reprimand is to occur, the severity of such a reprimand. This helps ensure reprimands are fairer and more consistently applied. The present technique also ensures this information is made available to a reprimanded user. This allows a reprimanded user to understand why they have been reprimanded and helps improve the likelihood they will change their behaviour in the future. The technical solution of the present technique thus helps reduce online abuse of users of multi-user online content and improve the online experience of all users.

Example(s) of the present disclosure are defined by the following numbered clauses:

1. A data processing apparatus comprising circuitry configured to: receive a first signal indicative of one or more words communicated from a first user of online content to one or more second users of online content; classify the one or more words using the first signal; receive one or more second signals indicative of one or more physiological characteristics of the one or more second users in response to the communicated one or more words; classify the one or more physiological characteristics of the one or more second users using the one or more second signals; determine, based on a classification of the one or more words and a classification of the one or more physiological characteristics of the one or more second users, whether to generate an action signal, the action signal indicating that an action associated with the first user of the online content is to be taken; and when it is determined an action signal is to be generated, generate and output the action signal.

2. A data processing apparatus according to clause 1, wherein the action comprises providing a warning message to the first user.

3. A data processing apparatus according to any preceding clause, wherein the action comprises denying further access of the first user to the online content.

4. A data processing apparatus according to any preceding clause, wherein the action comprises indicating the one or more words and/or information associated with the one or more physiological characteristics of the one or more second users to the first user.

5. A data processing apparatus according to any preceding clause, wherein: the action signal is output to a user interface to cause the user interface to indicate the one or more words and/or information associated with the one or more physiological characteristics of the one or more second users; and in response to the user interface receiving a predetermined input, the circuitry is configured to cause a signal to be transmitted to a second data processing apparatus associated with the first user to cause the second data processing apparatus to implement the action.

6. A data processing apparatus according to any one of clauses 1 to 4, wherein: the action signal is transmitted to a second data processing apparatus associated with the first user to cause the second data processing apparatus to implement the action.

7. A data processing apparatus according to any preceding clause, wherein: the one or more physiological characteristics of the one or more second users comprise a value of one or more measured physiological parameters of the one or more second users; and classifying the one or more physiological characteristics of the one or more second users comprises determining whether a change in the value of the one or more measured physiological parameters of at least a portion of the one or more second users exceeds a threshold within a predetermined time period following communication of the one or more words from the first user to the one or more second users.

8. A data processing apparatus according to clause 7, wherein the one or more measured physiological parameters of the one or more second users comprise a heart rate.

9. A data processing apparatus according to clause 7 or 8, wherein the measured physiological parameters of the one or more second users comprise a perspiration level.

10. A data processing apparatus according to any preceding clause, wherein the circuitry is configured to classify the one or more words, classify the one or more physiological characteristics of the one or more second users and/or determine whether to generate the action signal only in response to receiving a signal from a third data processing apparatus associated with one of the second users indicating a problem with user conduct associated with the online content.

11. A data processing method comprising: receiving a first signal indicative of one or more words communicated from a first user of online content to one or more second users of online content; classifying the one or more words using the first signal; receiving one or more second signals indicative of one or more physiological characteristics of the one or more second users in response to the communicated one or more words; classifying the one or more physiological characteristics of the one or more second users using the one or more second signals; determining, based on a classification of the one or more words and a classification of the one or more physiological characteristics of the one or more second users, whether to generate an action signal, the action signal indicating that an action associated with the first user of the online content is to be taken; and when it is determined an action signal is to be generated, generating and outputting the action signal.

12. A program for controlling a computer to perform a method according to clause 11.

13. A storage medium storing a program according to clause 12.

14. A data processing apparatus comprising circuitry configured to: receive a first signal indicative of one or more words communicated from a first user of online content to one or more second users of online content; classify the one or more words using the first signal; receive one or more second signals indicative of one or more physiological characteristics of the first user within a time period of a start of the communication of the one or more words; classify the one or more physiological characteristics using the one or more second signals; based on a classification of the one or more words and a classification of the one or more physiological characteristics, generate an action signal indicating that an action associated with the first user of the online content is to be taken, the action signal indicating a characteristic of the action determined based on a combination of the classification of the one or more words and the classification of the one or more physiological characteristics; and output the action signal.

15. A data processing apparatus according to clause 14, wherein the action comprises providing one of a plurality of types of warning to the first user, the one of the plurality of warning messages being selected based on the characteristic of the action indicated by the action signal.

16. A data processing apparatus according to clause 14 or 15, wherein the action comprises denying further access of the first user to the online content.

17. A data processing apparatus according to any one of clauses 14 to 16, wherein the action comprises indicating the one or more words and/or information associated with the one or more physiological characteristics to the first user.

18. A data processing apparatus according to any one of clauses 14 to 17, wherein: the action signal is output to a user interface to cause the user interface to indicate the one or more words, information associated with the one or more physiological characteristics and/or the characteristic of the action; and in response to the user interface receiving a predetermined input, the circuitry is configured to cause a signal to be transmitted to a second data processing apparatus associated with the first user to cause the second data processing apparatus to implement the action.

19. A data processing apparatus according to any one of clauses 14 to 17, wherein: the action signal is transmitted to a second data processing apparatus associated with the first user to cause the second data processing apparatus to implement the action.

20. A data processing apparatus according to any one of clauses 14 to 19, wherein the one or more physiological characteristics comprise a heart rate of the first user.

21. A data processing apparatus according to any one of clauses 14 to 20, wherein the one or more physiological characteristics comprise a perspiration level of the first user.

22. A data processing apparatus according to any one of clauses 14 to 21, wherein the one or more physiological characteristics comprise an image of a facial expression of the first user.

23. A data processing apparatus according to any one of clauses 14 to 22, wherein the circuitry is configured to classify the one or more words, classify the one or more physiological characteristics and/or generate the action signal only in response to receiving a signal from a third data processing apparatus associated with one of the second users indicating a problem with user conduct associated with the online content.

24. A data processing apparatus according to any one of clauses 14 to 23, wherein the circuitry is configured to: receive one or more third signals indicative of one or more physiological characteristics of the one or more second users in response to the communicated one or more words; classify the one or more physiological characteristics of the one or more second users using the one or more third signals; and determine the characteristic of the action signal based on the classification of the one or more physiological characteristics of the one or more second users.

25. A data processing method comprising: receiving a first signal indicative of one or more words communicated from a first user of online content to one or more second users of online content; classifying the one or more words using the first signal; receiving one or more second signals indicative of one or more physiological characteristics of the first user within a time period of a start of the communication of the one or more words; classifying the one or more physiological characteristics using the one or more second signals; based on a classification of the one or more words and a classification of the one or more physiological characteristics, generating an action signal indicating that an action associated with the first user of the online content is to be taken, the action signal indicating a characteristic of the action determined based on a combination of the classification of the one or more words and the classification of the one or more physiological characteristics; and outputting the action signal.

26. A program for controlling a computer to perform a method according to clause 25.

27. A storage medium storing a program according to clause 26.

Numerous modifications and variations of the present disclosure are possible in light of the above teachings. It is therefore to be understood that, within the scope of the claims, the disclosure may be practiced otherwise than as specifically described herein.

In so far as embodiments of the disclosure have been described as being implemented, at least in part, by one or more software-controlled information processing apparatuses, it will be appreciated that a machine-readable medium (in particular, a non-transitory machine-readable medium) carrying such software, such as an optical disk, a magnetic disk, semiconductor memory or the like, is also considered to represent an embodiment of the present disclosure. In particular, the present disclosure should be understood to include a non-transitory storage medium comprising code components which cause a computer to perform any of the disclosed method(s).

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more computer processors (e.g. data processors and/or digital signal processors). The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to these embodiments. Additionally, although a feature may appear to be described in connection with particular embodiments, one skilled in the art would recognize that various features of the described embodiments may be combined in any manner suitable to implement the present disclosure.

The invention claimed is:

1. A data processing apparatus, comprising:
circuitry configured to:
receive, via a communication interface, a first signal indicative of one or more words communicated from a first user of online content to one or more second users of online content, the one or more words being communicated from the first user to the one or more second users over a network and the one or more second users being different to the first user;
classify the one or more words using the first signal;
receive, via a peripheral device, one or more second signals indicative of one or more physiological characteristics of the first user within a time period of a start of the communication of the one or more words;
classify the one or more physiological characteristics using the one or more second signals;
based on a classification of the one or more words and a classification of the one or more physiological characteristics, generate an action signal indicating that an action associated with the first user of the online content is to be taken, the action comprising reprimanding the first user to discourage abusive behavior by providing one of a plurality of types of warning to the first user, and the action signal indicating a characteristic of the action determined based on a combination of the classification of the one or more words and the classification of the one or more physiological characteristics, the one of the plurality of types of warning being based on the characteristic of the action indicated by the action signal; and output, via a display, the action signal,
wherein the circuitry is configured to classify the one or more words, classify the one or more physiological characteristics and/or generate the action signal in response to receiving a signal from a data processing apparatus associated with one of the second users indicating a problem with user conduct associated with the online content.

2. The data processing apparatus according to claim 1, wherein the action comprises denying further access of the first user to the online content.

3. The data processing apparatus according to claim 1, wherein the action comprises indicating the one or more words and/or information associated with the one or more physiological characteristics to the first user.

4. The data processing apparatus according to claim 1, wherein:
the action signal is output to a user interface to cause the user interface to indicate the one or more words, information associated with the one or more physiological characteristics and/or the characteristic of the action; and
in response to the user interface receiving a predetermined input, the circuitry is configured to cause a signal to be transmitted to a second data processing apparatus associated with the first user to cause the second data processing apparatus to implement the action.

5. The data processing apparatus according to claim 1, wherein: the action signal is transmitted to a second data processing apparatus associated with the first user to cause the second data processing apparatus to implement the action.

6. The data processing apparatus according to claim 1, wherein the one or more physiological characteristics comprise a heart rate of the first user.

7. The data processing apparatus according to claim 1, wherein the one or more physiological characteristics comprise a perspiration level of the first user.

8. The data processing apparatus according to claim 1, wherein the one or more physiological characteristics comprise an image of a facial expression of the first user.

9. The data processing apparatus according to claim 1, wherein the circuitry is configured to:
receive one or more third signals indicative of one or more physiological characteristics of the one or more second users in response to the communicated one or more words;
classify the one or more physiological characteristics of the one or more second users using the one or more third signals; and
determine the characteristic of the action signal based on the classification of the one or more physiological characteristics of the one or more second users.

10. A data processing method comprising:
receiving a first signal indicative of one or more words communicated from a first user of online content to one or more second users of online content, the one or more words being communicated from the first user to the one or more second users over a network and the one or more second users being different to the first user;
classifying the one or more words using the first signal;
receiving one or more second signals indicative of one or more physiological characteristics of the first user within a time period of a start of the communication of the one or more words;
classifying the one or more physiological characteristics using the one or more second signals;
based on a classification of the one or more words and a classification of the one or more physiological characteristics, generating an action signal indicating that an action associated with the first user of the online content is to be taken, the action comprising reprimanding the first user to discourage abusive behavior by providing one of a plurality of types of warning to the first user, and the action signal indicating a characteristic of the action determined based on a combination of the classification of the one or more words and the classification of the one or more physiological characteristics, the one of the plurality of types of warning being based on the characteristic of the action indicated by the action signal; and
outputting the action signal,
wherein classifying the one or more words, classifying the one or more physiological characteristics and/or generating the action signal is performed in response to receiving a signal from a data processing apparatus associated with one of the second users indicating a problem with user conduct associated with the online content.

11. A non-transitory computer-readable storage medium storing a program for controlling a computer to perform a method comprising:
receiving a first signal indicative of one or more words communicated from a first user of online content to one or more second users of online content, the one or more words being communicated from the first user to the one or more second users over a network and the one or more second users being different to the first user;
classifying the one or more words using the first signal;
receiving one or more second signals indicative of one or more physiological characteristics of the first user within a time period of a start of the communication of the one or more words;
classifying the one or more physiological characteristics using the one or more second signals;
based on a classification of the one or more words and a classification of the one or more physiological characteristics, generating an action signal indicating that an action associated with the first user of the online content is to be taken, the action comprising reprimanding the first user to discourage abusive behavior by providing one of a plurality of types of warning to the first user, and the action signal indicating a characteristic of the action determined based on a combination of the classification of the one or more words and the classification of the one or more physiological characteristics, the one of the plurality of types of warning being based on the characteristic of the action indicated by the action signal; and
outputting the action signal,
wherein classifying the one or more words, classifying the one or more physiological characteristics and/or generating the action signal is performed in response to receiving a signal from a data processing apparatus associated with one of the second users indicating a problem with user conduct associated with the online content.

* * * * *